(12) United States Patent
Austrheim et al.

(10) Patent No.: US 12,538,876 B2
(45) Date of Patent: Feb. 3, 2026

(54) STORAGE GRID FOR VERTICAL FARMING

(71) Applicant: Autostore Technology AS, Nedre Vats (NO)

(72) Inventors: Trond Austrheim, Etne (NO); Ingvar Fagerland, Kolnes (NO)

(73) Assignee: AutoStore Technology AS, Nedre Vats (NO)

(*) Notice: Subject to any disclaimer, the term of this patent is extended or adjusted under 35 U.S.C. 154(b) by 0 days.

(21) Appl. No.: 18/693,061

(22) PCT Filed: Sep. 12, 2022

(86) PCT No.: PCT/EP2022/075328
§ 371 (c)(1),
(2) Date: Mar. 18, 2024

(87) PCT Pub. No.: WO2023/046519
PCT Pub. Date: Mar. 30, 2023

(65) Prior Publication Data
US 2025/0127099 A1 Apr. 24, 2025

(30) Foreign Application Priority Data
Sep. 24, 2021 (NO) .................................. 20211145

(51) Int. Cl.
*A01G 9/02* (2018.01)
*A01G 9/14* (2006.01)
(Continued)

(52) U.S. Cl.
CPC ............. *A01G 9/143* (2013.01); *A01G 9/022* (2013.01); *A01G 9/249* (2019.05); *B65G 1/0464* (2013.01); *B65G 2201/0211* (2013.01)

(58) Field of Classification Search
CPC ........ A01G 9/143; A01G 9/249; A01G 9/022; B65G 1/0464; B65G 2201/0211
(Continued)

(56) References Cited

U.S. PATENT DOCUMENTS

2012/0324788 A1* 12/2012 Sakura .................. A01G 31/04
414/277
2014/0017043 A1 1/2014 Hirai et al.
(Continued)

FOREIGN PATENT DOCUMENTS

| CN | 112236375 A | 1/2021 |
| CN | 212970921 U | 4/2021 |

(Continued)

OTHER PUBLICATIONS

International Search Report issued in PCT/EP2022/075328 on Dec. 8, 2022 (3 pages).
(Continued)

*Primary Examiner* — Zoe Tam Tran
(74) *Attorney, Agent, or Firm* — Baker Botts L.L.P.

(57) ABSTRACT

An illuminable storage grid is for storing and cultivating crops within containers. The illuminable storage grid includes a plurality of horizontally extending container supporting frameworks distributed vertically with vertical offsets. Each container supporting framework includes a container support for supporting a plurality of containers and a support displacement system for displacing the container support horizontally. Each container support is arranged above a lowermost container supporting framework display(s) at least one hole with an opening of at least a maximum horizontal cross section of the containers to be stored. At least one of the container supports above the lowermost container supporting framework is an illuminable container support enabling illumination.

20 Claims, 21 Drawing Sheets

(51) Int. Cl.
  *A01G 9/24* (2006.01)
  *B65G 1/04* (2006.01)
(58) Field of Classification Search
  USPC .......................................................... 47/66.6
  See application file for complete search history.

(56) References Cited

U.S. PATENT DOCUMENTS

| | | | |
|---|---|---|---|
| 2015/0000191 A1 | 1/2015 | Nagadome et al. | |
| 2015/0282437 A1* | 10/2015 | Ohara .................... | A01G 9/247 |
| | | | 47/66.6 |
| 2018/0235156 A1* | 8/2018 | Blair ...................... | A01G 9/241 |
| 2019/0159415 A1* | 5/2019 | Bertram ............... | A01G 27/003 |
| 2020/0156868 A1* | 5/2020 | Bidram ................. | B65G 1/0492 |
| 2020/0391941 A1 | 12/2020 | Austrheim et al. | |
| 2021/0206570 A1 | 7/2021 | Austrheim | |

FOREIGN PATENT DOCUMENTS

| | | | | |
|---|---|---|---|---|
| EP | 2962962 | A1 | 1/2016 | |
| EP | 3269231 | A1 | 1/2018 | |
| EP | 3282830 | | 2/2018 | |
| EP | 3324099 | A1 | 5/2018 | |
| EP | 3326452 | A1 | 5/2018 | |
| EP | 3737622 | A1 | 11/2020 | |
| NO | 317366 | B1 | 10/2004 | |
| WO | 2014/090684 | A1 | 6/2014 | |
| WO | WO-2015193278 | A1 * | 12/2015 | ........... B65G 1/0464 |
| WO | 2016/166311 | A1 | 10/2016 | |
| WO | 2018/050816 | A1 | 3/2018 | |
| WO | 2019/195027 | A1 | 10/2019 | |
| WO | 2019/206487 | A1 | 10/2019 | |

OTHER PUBLICATIONS

Written Opinion of the International Searching Authority issued in PCT/EP2022/075328 on Dec. 8, 2022 (8 pages).
Office Action issued in Norwegian Patent Application No. 20211145, mailed on Apr. 13, 2022 (4 pages).
Norwegian Search Report issued in NO 20211145 mailed on Apr. 13, 2022 (2 pages).
Office Action issued in Norwegian Patent Application No. 20211145, mailed on Nov. 8, 2022 (2 pages).
Li, Ning, Office Action in CN202280063763.3, mailed Oct. 27, 2025, 17 pages, The State Intellectual Property Office of the People's Republic of China, Beijing, China.

* cited by examiner

A

B

STORAGE GRID FOR VERTICAL FARMING

FIELD OF THE INVENTION

The present invention relates to an illuminable storage grid for storing and cultivating crops, an automated storage and retrieval system for storing and retrieving crops from/to such a storage grid and a method thereof.

BACKGROUND AND PRIOR ART

FIG. 1 discloses an automated storage and retrieval system 1 with a framework/storage grid 101 supported on a floor/platform 900 and FIGS. 2, 3 and 4 disclose three different prior art remotely operated vehicles 200,300,350 suitable for operating on such a storage grid 101 and for handling containers 106.

The storage grid 101 comprises upright members 102 and a storage volume comprising storage columns 105 arranged in rows between the upright members 102. In these storage columns 105 containers/bins 106 are stacked one on top of one another to form stacks 107. The members 102 may typically be made of metal, e.g. extruded aluminum profiles.

The storage grid 101 of the automated storage and retrieval system 1 comprises a rail system 108 arranged across the top of the storage grid 101, on which rail system 108 a plurality of remotely operated vehicles 200,300,350 may be operated to raise containers 106 from, and lower containers 106 into, the storage columns 105, and also to transport the containers 106 above the storage columns 105. The rail system 108 comprises a first set of parallel rails 110 arranged to guide movement of the vehicles 200,300,350 in a first direction X across the top of the storage grid 101, and a second set of parallel rails 111 arranged perpendicular to the first set of rails 110 to guide movement of the vehicles 200,300,350 in a second direction Y which is perpendicular to the first direction X. Containers 106 stored in the storage columns 105 are accessed by the vehicles 200,300,350 through access openings 112 in the rail system 108. The vehicles 200,300,350 can move laterally above the storage columns 105, i.e. in a plane which is parallel to the horizontal X-Y plane.

The upright members 102 of the storage grid 101 may be used to guide the containers 106 during raising of the containers out from, and lowering of the containers into, the columns 105. The stacks 107 of containers 106 are typically self-supportive.

Referring to FIGS. 2-4, each prior art vehicles 200,300, 350 comprises a vehicle body 201,301,351 and first and second sets of wheels 202a,202b,302a,302b,352a,352b which enable the lateral movement of vehicles 200,300,350 in the X direction and in the Y direction, respectively. In FIGS. 2 and 3 two wheels in each set of four wheels are visible, while in FIG. 4, three wheels in each set of four wheels are visible. The first set of wheels 202a,302a,352a is arranged to engage with two adjacent rails of the first set 110 of rails, and the second set of wheels 202b,302b,352b is arranged to engage with two adjacent rails of the second set 111 of rails. At least one of the sets of wheels 202a,302a, 352a,202b,302b,352b can be lifted and lowered, so that the first set of wheels 202a,302a,352a and/or the second set of wheels 202b,302b,352b can be engaged with the respective set of rails 110, 111 at any one time.

Each prior art vehicle 200,300,350 also comprises a lifting device 210,360 for vertical transportation of containers 106, e.g. raising a container 106 from, and lowering a container 106 into, a storage column 105. The lifting device 210,360 comprises one or more gripper elements 362 which are adapted to engage a container 106, and which gripping elements 362 can be lowered from the vehicle 200,300,350 so that the position of the gripping elements 362 with respect to the vehicle body 201,301,351 can be adjusted in a third direction Z orthogonal to the first direction X and the second direction Y. The lifting device 210,360 may also comprise lifting bands (not shown) connected at one end to a frame of the lifting device 210,360 and the other end to a winch mechanism (not shown). A part of the lifting device 210,360 of the vehicles 200,350 are shown in FIG. 2 and FIG. 4. The lifting device of the vehicle 300 shown in FIG. 3 is located within the vehicle body 301.

Conventionally, and also for the purpose of this application, Z=1 identifies the uppermost layer of containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of containers. Similarly, X=1 ... n and Y=1 ... n identifies the position of each storage column 105 in the horizontal plane. Consequently, as an example, and using the Cartesian coordinate system X, Y, Z indicated in FIG. 1, the container identified as 106' in FIG. 1 can be said to occupy storage position X=19, Y=1 and Z=3. The vehicles 200,300,350 can be said to travel in layer Z=0, and each storage column 105 can be identified by its X and Y coordinates.

The possible storage positions within the storage grid 101 are referred to as storage cells. Each storage column 105 may be identified by a position in an X- and Y-direction, while each storage cell may be identified by a container number in the X-, Y and Z-direction.

Each prior art vehicle 200,300,350 comprises a storage compartment or space for receiving and stowing a container 106 when transporting the container 106 across the rail system 108.

The storage space may be below a cantilever construction of a remotely operated vehicle 200 as shown in FIG. 2. Such a vehicle is described in detail in e.g. NO317366, the contents of which are also incorporated herein by reference.

In another configuration, the storage space may comprise a cavity arranged internally within the vehicle body 301,351 as shown in FIGS. 3 and 4 and as described in e.g. WO2015/193278A1 and WO2019/206487A1, the contents of which are incorporated herein by reference.

The remotely operated vehicle 300 shown in FIG. 3 may have a centrally arranged cavity and a footprint that covers an area with dimensions in the X and Y directions which is generally equal to the lateral extent of a storage column 105, e.g. as described in WO2015/193278A1, the contents of which are incorporated herein by reference.

Alternatively, the remotely operated vehicle 350 may have a footprint which is larger than the lateral area defined by a storage column 105 as shown in FIGS. 1 and 4, and as is disclosed in e.g. WO2014/090684A1, EP2962962 or WO2019/206487A1.

Note that the term 'lateral' used herein may mean 'horizontal'.

FIG. 1 shows remotely operated vehicles with a plurality of cantilever vehicles 200 (FIG. 3) and a plurality of vehicles 350 (FIG. 4) which extend beyond the footprint of a single storage column 105.

The prior art rail system 108 typically comprises rails 110,111 with grooves in which the wheels 202a-b,302a-b, 352a-b of the vehicles 200,300,250 run. Alternatively, the rails 110,111 may comprise upwardly protruding elements, where the wheels 202a-b,302a-b,352a-b of the vehicles 200,300,250 comprise flanges to prevent derailing. These grooves and upwardly protruding elements are collectively known as tracks. Each rail 110,111 may comprise one track, or each rail 110,111 may comprise two parallel tracks. Each rail 110,111 may also comprise two track members that are fastened together, each track member providing one of a pair of tracks provided by each rail 110,111.

WO2018/146210,360, the contents of which are incorporated herein by reference, illustrates a typical configuration of rail system 108 comprising rails 110,111 and parallel tracks in both X and Y directions.

In the storage grid 101, a majority of the columns are storage columns 105, i.e. columns where containers 106 are stored in stacks 107. However, some columns may have other purposes. In FIG. 1, columns 119 and 120 are such special-purpose columns used by the vehicles 200,300,350 to drop off and/or pick up containers 106 so that they can be transported to an access station (not shown) where the containers 106 can be accessed from outside of the storage grid 101 or transferred out of or into the storage grid 101. Within the art, such a location is normally referred to as a 'port' and the column in which the port is located may be referred to as a 'port column' 119,120. The transportation to the access station may be in any direction, that is horizontal, tilted and/or vertical. For example, the containers 106 may be placed in a random or dedicated storage column 105 within the storage grid 101, then picked up by any vehicle 200,300,350 and transported to a port column 119,120 for further transportation to an access station. Note that the term 'tilted' means transportation of containers 106 having a general transportation orientation somewhere between horizontal and vertical.

In FIG. 1, the first port column 119 may for example be a drop-off port column where the vehicles 200,300,350 can drop off containers 106 to be transported to an access and distribution station, and the second port column 120 may be a dedicated pick-up port column where the vehicles 200, 300,350 can pick up containers 106 that have been transported from the access and distribution station.

The access and distribution station may typically be a picking or a stocking station where product items are removed from or positioned into the containers 106. In a picking or a stocking station, the containers 106 are normally not removed from the automated storage and retrieval system 1, but are returned into the storage grid 101 again once accessed. A port 119,120 can also be used for transferring containers to another storage facility (e.g. to another storage grid or to another automated storage and retrieval system), to a transport vehicle (e.g. a train or a lorry), or to a production facility.

When a target container 106' stored in one of the storage columns 105 disclosed in FIG. 1 is to be accessed, one of the vehicles 200,300,350 is instructed to retrieve the target container 106' from its position and transport it to the drop-off port column 119. This operation involves moving the vehicle 200,300,350 to a location above the storage column 105 in which the target container 106' is positioned, retrieving the container 106 from the storage column 105 using the vehicle's 200,300,350 lifting device 210,360, and transporting the container 106 to the drop-off port column 119. If the target container 106' is located deep within a stack 107, i.e. with one or a plurality of other containers 106 positioned above the target container 106', the operation also involves temporarily moving the above-positioned containers 106 prior to lifting the target container 106' from the storage column 105. This step, which is sometimes referred to as "digging" within the art, may be performed with the same vehicle that is subsequently used for transporting the target container to the drop-off port column 119, or with one or a plurality of other cooperating vehicles. Alternatively, or in addition, the automated storage and retrieval system 1 may have vehicles specifically dedicated to the task of temporarily removing containers from a storage column 105. Once the target container 106' has been removed from the storage column 105, the temporarily removed containers 106 can be repositioned into the original storage column 105. However, the removed containers 106 may alternatively be relocated to other storage columns 105.

When a container 106' is to be stored in one of the columns 105, one of the vehicles 200,300,350 is instructed to pick up the container 106' from the pick-up port column 120 and transport it to a location above the storage column 105 where it is to be stored. After any containers 106 positioned at or above the target position within the storage column stack 107 have been removed, the vehicle 200,300, 350 positions the target container 106' at the desired position. The removed containers 106 may then be lowered back into the storage column 105, or relocated to other storage columns.

For monitoring and controlling the automated storage and retrieval system 1, e.g. monitoring and controlling the location of respective containers 106 within the storage grid 101, the content of each container 106, and the movement of the remotely operated vehicles 200,300,350 so that a desired container 106' can be delivered to the desired location at the desired time without the vehicles 200,300,350 colliding with each other, the automated storage and retrieval system 1 comprises a control system 600 which typically is computerized and which typically comprises a database for keeping track of the containers 106.

Vertical farming using cubic storage systems are known. One example of such storage system is described in EP 3326452 A1 where bins with plants/crops are arranged in stacks, and where individual bins may be removed or inserted by a load handling device operating on rails on top of a storage grid. The prior art system also includes an illumination system comprising a controller and lighting device arranged above each bin. The controller may control the spectrum of emitted light. A similar prior art system with stacked bins is disclosed in EP 3282830 A1.

For vertical farming, a storage system with stacks 107 of bins 106 is technically challenging since plants arranged within each bin 106 require both light and water to survive. Furthermore, due to the compactness of the stacks 107, any maintenance of equipment related to the illuminations and/or irrigations may prove difficult.

An objective of the present invention is therefore to provide a storage grid and a storage and retrieval system which allows easy access and treatment of plants/crops in individual containers.

Another objective of the present invention to provide a storage grid and a storage and retrieval system which allows maintenance of related equipment without the need of shutting down the operation.

Yet another objective is to provide a storage and retrieval system in which the time efficiency of storing and retrieving plants/crops can be selected by the user depending on urgency and/or priority.

Hereinafter, 'plants' or 'crops' are to be interpreted broadly to include any hydroponic cultivation systems such as herbs, medicinal plants, ornamental and general crops/ plants, algae, etc. Storage of aquaponic cultivation systems within the containers may also be envisaged.

SUMMARY OF THE INVENTION

The invention is set forth in the independent claims and the dependent claims describe certain optional features of the invention.

In a first aspect, the invention concerns an illuminable storage grid for storing and cultivating crops within containers The illuminable storage grid comprises a plurality of horizontal container supporting frameworks distributed vertically with vertical offsets $\Delta dV$. The vertical offsets may vary according to the desired height of the containers. However, in a typical configuration with identical containers, the vertical offsets are equal or near equal.

Each container supporting framework comprises at least one container support for supporting a plurality of containers and at least one support displacement system for displacing the container support horizontally.

The at least one container support of at least one of the plurality of horizontal container supporting frameworks arranged above a lowermost container supporting framework display(s) at least one hole with an opening of at least a maximum horizontal cross section of the containers to be stored.

Typically, all container supports of all container supporting frameworks above the lowermost container supporting framework displays such hole(s).

The plurality of container supporting frameworks may be of equal or near equal horizontal extent. Furthermore, the holes of the container support(s) may be vertically alignable by movement of one, some or all of the container support(s).

At least one, and preferably all, of the container supports above the lowermost container supporting framework is an illuminable container support enabling illumination into contents of the containers, thereby assisting cultivation of any crops/biological species such as plants In one exemplary configuration, the illuminable container support is configured to illuminate contents within the containers at a predetermined wavelength and/or at a wavelength range in order to optimize cultivation within the containers. The optimization may involve optimizing (or at least enhancing) photosynthesis of the crops/biological species.

The predetermined wavelength or wavelength range may be set by the user prior to illumination and/or during illumination. The latter option requires that the illuminable container support is configured for in-situ adjustment of the light wavelength(s) by a control system, for example the control system for controlling the operation of the entire illuminable storage grid.

The illumination may involve one or more lamps set to deliver a predetermined power of light output at a particular wavelength and/or wavelength range.

In another exemplary configuration, the illuminable storage grid further comprises one or more reflectors configured to focus the illumination into the contents of the containers.

Alternatively, or in addition, the illuminable container support may include one or more diffusers for spreading out/scatter the illumination prior to illuminating the contents.

The distance(s) between the container supporting frameworks may also be adjusted/optimized for cultivation of crops. Such distance(s) may depend on parameters such as type of crops/plants, the intensity and/or wavelength(s) emitted from the illumination sources and choice/use of illumination modification means such as reflectors or diffusers. Adjustments of distance(s) may be performed by adjusting the gaps between the frameworks during installation and/or adjusting the height $H_f$ of the containers.

In yet another exemplary configuration, the illuminable container support comprises a container support frame and a plurality of illumination units onto each of which at least one container may be supported. Each illumination unit may comprise an illumination source such as light-emitting diodes configured to illuminate a volume adjacent the illuminable unit. Typically, each illumination unit supports a single container. The volume is preferably below the illuminable unit, for example directly below.

In yet another exemplary configuration, each illumination unit is removably coupled to the container support frame, thereby allowing reconfigurability of the illumination system/units. The removable coupling also facilitates maintenance of the illumination system.

Each illumination unit may be arranged fully within, partially within or on the container support frame. A configuration where each illumination unit is suspended from the container support frame may also be envisaged.

In yet another exemplary configuration, each of the plurality of illumination units further comprises an illumination frame having an upper face onto which a container may be supported.

In yet another exemplary configuration, each illumination unit further comprises an illumination frame having a lower face at which the illumination source is arranged, thereby enabling downlights into the contents of the containers situated below the illuminable container support.

The lower face may also act as a reflector and/or as a diffuser as described above. The reflector and/or diffuser may also, or alternatively, be separated units coupled to the lower face.

The illumination frame having the illumination source arranged onto the lower face is typically the same illumination frame having the container supporting upper face.

In yet another exemplary configuration, at least one, and preferably each, of the illumination units comprises a grippable structure such as hole(s) and/or recess(es) allowing a releasably coupling to be established with a lifting device of a remotely operated vehicle/crane operating above the uppermost container supporting framework.

In yet another exemplary configuration, the illumination unit comprises a power connector, preferably spring-loaded, configured to receive power from an illumination power supply and for supplying the received power to the illumination source. The illumination power supply may constitute part of the container support frame, for example one or more power lead carrying bars extending in one or both principal directions of the container support frame below the illumination units. Alternatively, or in addition, the container support frame may include non-integrated power leads running through sections.

In yet another exemplary configuration, the one or more container supports of each horizontal container supporting framework have principal directions in a first direction X and an orthogonal second direction Y and is configured as a matrix of container spaces with a plurality of container spaces arranged in the first direction X and a plurality of container spaces arranged in the second direction Y. At least one of the plurality of illumination units may be arranged in one of the plurality of container spaces.

In yet another exemplary configuration, one or more of the container supports display a plurality of holes, each having an opening of at least a maximum horizontal cross section of the containers to be stored. The plurality of holes are preferably distributed evenly along at least one principal direction of the one or more container supports. Hence, the container supports may be displaced such that, when holes at one specific X,Y location are vertically alignable, the remaining holes are also vertically alignable.

In yet another exemplary configuration, the support displacement system comprises a displacement mechanism allowing displacement of the container support(s) in at least one principal direction Y and a remotely controlled displacement motor operably coupled to the displacement mechanism. The displacement mechanism may be a linear actuator, a gearwheel drive, a chain drive, a belt drive, or a combination thereof.

The displacement system may include such displacement mechanisms and remotely controlled motor for some or all of the container supporting frameworks, for example for all container support frameworks except the lowermost container supporting framework.

Said displacement of container supports may be achieved by rotating an axle oriented along the second direction (Y) by use of an electric motor. The rotation of the axle further induces rotation of one or more driving belts extended along the framework in the first direction (X). Hence, when attached to the driving belt(s), rotation of the axle causes the desired displacement of the framework in the first direction (X).

In yet another exemplary configuration, the illuminable storage grid further comprises a control system configured to operate the displacement system such that the container support of at least the one or more horizontal container supporting frameworks arranged above the lowermost container supporting framework may be displaced independently to each other.

In yet another exemplary configuration, the illuminable storage grid further comprises a rail system comprising a first set of parallel rails extending in a first direction X and a second set of parallel rails extending in a second direction Y perpendicular to the first direction X.

The first and second sets of rails form a grid pattern comprising a plurality of adjacent grid cells, wherein each of the grid cells comprises a grid opening defined by a pair of adjacent rails of the first set of rails and a pair of adjacent rails of the second set of rails.

In yet another exemplary configuration, the container supports are individually displaceable a distance corresponding to the distance of n grid cells in the first and/or second direction (Y), where n is an integer of 1 or more.

In yet another exemplary configuration, the container support, or each of the container supports, in some or each container supporting framework may display a plurality of holes distributed with an offset corresponding to n+1 grid cells in the second direction Y, where n is an integer of 1 or more.

Alternatively, the container support, or each of the container supports, in some or each container supporting framework may display a plurality of holes distributed with an offset corresponding to 2n+1 grid cells in the second direction Y, where n is an integer of 1 or more.

The rail system and the container supporting framework may have equal or near equal horizontal extent.

In this particular configuration the rail system is arranged above and adjacent to the uppermost container supporting framework at a first vertical offset $V_{r1}$ being at least a maximum height of the containers to be stored on the uppermost container supporting framework. Typically, the first vertical offset $V_{r1}$ and the vertical offsets $\Delta dV$ between the remaining container supporting frameworks are equal or near equal.

In yet another exemplary configuration, the illuminable storage grid further comprises a ventilation system for guiding flow of fluids such as air in between the plurality of container supporting frameworks. The ventilation system may comprise a plurality of ventilation fans arranged at least partly within the vertical offsets $\Delta dV$ between the container supporting frameworks, and preferably at the periphery of the supporting frameworks.

In a second aspect, the invention concerns an automated storage and retrieval system comprising an illuminable storage grid in accordance with the description above, a plurality of containers supported on the at least one container support of at least one of the plurality of container supporting frameworks, a remotely operated vehicle such as a wheeled vehicle or suspended crane configured to move horizontally above the plurality of container supporting frameworks and a control system configured to monitor and control wirelessly movements of the remotely operated vehicle. The remotely operated vehicle comprises a lifting device configured to releasably grab and lift at least one of the containers. The control system may be a dedicated control system, the same control system operating the support displacement system or a combination thereof.

In an exemplary configuration, the illuminable storage grid is further in accordance with the configuration of the storage grid including the first and second sets of rails. The containers are supported on the container support of each container supporting frameworks such that each container is positioned directly below the grid opening of the rail system. Furthermore, the remotely operated vehicle is configured to move horizontally in the first direction X and the second direction Y on the rail system and to lift the container through the grid opening by use of the lifting device.

In a third aspect, the invention concerns a method for storing and retrieving containers with crops from an automated storage and retrieval system in accordance with the description above having the possibility of illuminating the crops for cultivation.

In the third aspect, the illuminable container support(s) comprise(s) one or more container support frames and a plurality of illumination units onto each of which at least one container may be supported.

Each of the plurality of illumination units is coupled to the container support frame(s) and comprises an illumination source configured to illuminate a volume adjacent, and preferably below, the illumination unit.

The method comprises the following steps:

A. moving the remotely operated vehicle to a position where its lifting device is positioned in vertical alignment above either a target container supported on the uppermost container supporting framework or, if the target container is situated on one of the container supporting frameworks beneath the uppermost container supporting framework, a target hole of the uppermost container supporting framework located horizontally closest to the target container, B. if the target container is not positioned in vertical alignment below the target hole of the uppermost container supporting framework and holes of any container supporting frameworks therebetween, displacing the container support(s) of at least one of the plurality of container supporting frameworks until the target container is in vertical alignment below the hole of the uppermost container supporting framework and holes of any container supporting frameworks arranged between the container supporting framework with the target container and the uppermost container supporting framework, C. lowering, grabbing and lifting the target container by use of the lifting device and D. moving the remotely operated vehicle with the target container to another horizontal location.

In an exemplary method, step B involves equal, or near equal, displacements of the container support(s) of at least the one or more container supporting frameworks arranged above the container supporting framework containing the target container. The displacements are preferably performed simultaneous. The length of the displacements is the length sufficient to vertically align the target holes directly above the target container.

In a fourth aspect, the invention concerns a method for storing and retrieving containers from an automated storage and retrieval system in accordance with the description above having the possibility of illumination within the system.

In the fourth aspect the illuminable container support(s) comprise(s) a container support frame and a plurality of illumination units onto each of which at least one container may be supported.

Each of the plurality of illumination units is removably arranged within the container support frame, and comprises an illumination source configured to illuminate a volume adjacent, and preferably below, the illumination unit.

The method of the fourth aspect comprises the following steps:

A. moving the remotely operated vehicle to a position where its lifting device is positioned in vertical alignment above either a target illumination unit arranged within the uppermost container supporting framework or, if the target illumination unit is situated on one of the container supporting frameworks beneath the uppermost container supporting framework, a target hole of the uppermost container supporting framework located horizontally closest to the target illumination unit, B. if the target illumination unit is not positioned in vertical alignment below the target hole of the uppermost container supporting framework, displacing the container support(s) of at least one of the plurality of container supporting frameworks until the target illumination unit is in vertical alignment below the target hole of the uppermost container supporting framework and holes of any container supporting frameworks arranged between the container supporting framework with the target illumination unit and the uppermost container supporting framework, C. lowering, grabbing and lifting the target illumination unit by use of the lifting device and D. moving the remotely operated vehicle with the target illumination unit to another horizontal location.

In a fifth aspect, the invention concerns an illumination unit comprising an illumination source such as light emitting diodes, an illumination frame having an upper face and a lower face, wherein the upper face comprises a grippable structure such as through-going holes and/or recesses allowing releasable coupling with a lifting device and wherein the illumination source is coupled to the lower face allowing illumination of a volume below the illumination frame, and a power connector configured for receiving power from one or more illumination supplies and for supplying/distributing the received power to the illumination source.

In an exemplary configuration of the fifth aspect, the illumination frame is rectangular and comprises recesses at each corner to receive guiding pins of the lifting device.

In another exemplary configuration of the fifth aspect, the power connector is spring-loaded.

In yet another exemplary configuration of the fifth aspect, the illumination source is configured to emit light at a predetermined wavelength or a predetermined wavelength range to optimize cultivation of the crops within the containers, for example by optimizing, or at least enhancing, photosynthesis in plants. The predetermined wavelength range may be between 425 nm and 700 nm, for example within the wavelength range 425-450 nm (blue range) and/or the wavelength range 600-700 nm (red range). Examples of illumination sources are incandescent light bulb or lights emitted from LEDs.

In yet another exemplary configuration of the fifth aspect, the illumination unit further comprises a control system, wherein the illumination source is configured such that the wavelength or wavelength range may be adjusted during illumination by use the control system. The configuration is preferably such that the control system may communicate with the illumination source remotely.

In yet another exemplary configuration of the fifth aspect, the lower face of the illumination frame act as, and/or has coupled onto, a reflector configured to focus the illumination into contents of containers situated below.

In yet another exemplary configuration of the fifth aspect, the lower face of the illumination frame act as, and/or has coupled onto, a diffuser configured to spread out/scatter the illumination prior to illuminating the contents of containers situated below.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

FIG. 6A shows the system with a target container in an initial position, a vacant storage cell for a crop containable container in an initial position and a remotely operated vehicle carrying such a container, FIG. 6B shows the system with the vacant storage cell in a position ready to receive the container from the remotely operated vehicle, FIG. 6C shows the system where the container is placed in the previously vacant storage cell and a lifting device of the remotely operated vehicle has been retracted above the rail system, FIG. 6D shows the system with the remotely operated vehicle ready to lift the target container and FIG. 6E shows the system with the target container in a position ready to be lifted.

FIG. 13 is a perspective view of a part of an exemplary illuminable storage grid according to the invention, wherein FIG. 13A shows a belt driven support displacement device allowing displacement of the illuminable container support in FIG. 12 and FIG. 13B shows details of a container supporting framework rail into which the illuminable container support may be guided.

DETAILED DESCRIPTION OF THE INVENTION

Figure 1:
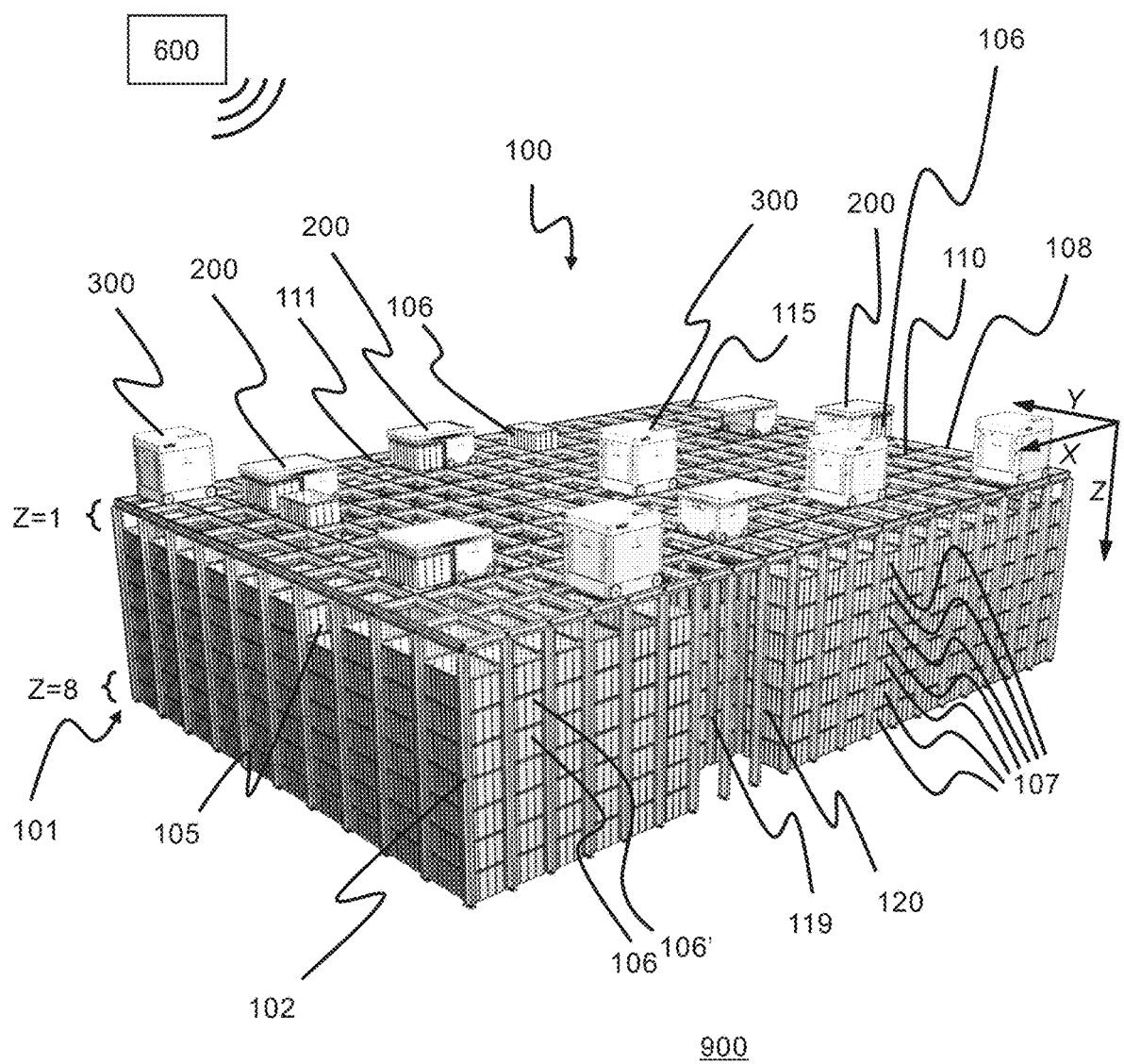
FIG. 1 is a perspective view of a prior art automated storage and retrieval system.

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

The present invention is a storage grid 400 used for storing and cultivating crops/biological species such as plants 80 within containers 106 and an automated storage and retrieval system 1 which includes such a storage grid 400.

Figure 5:
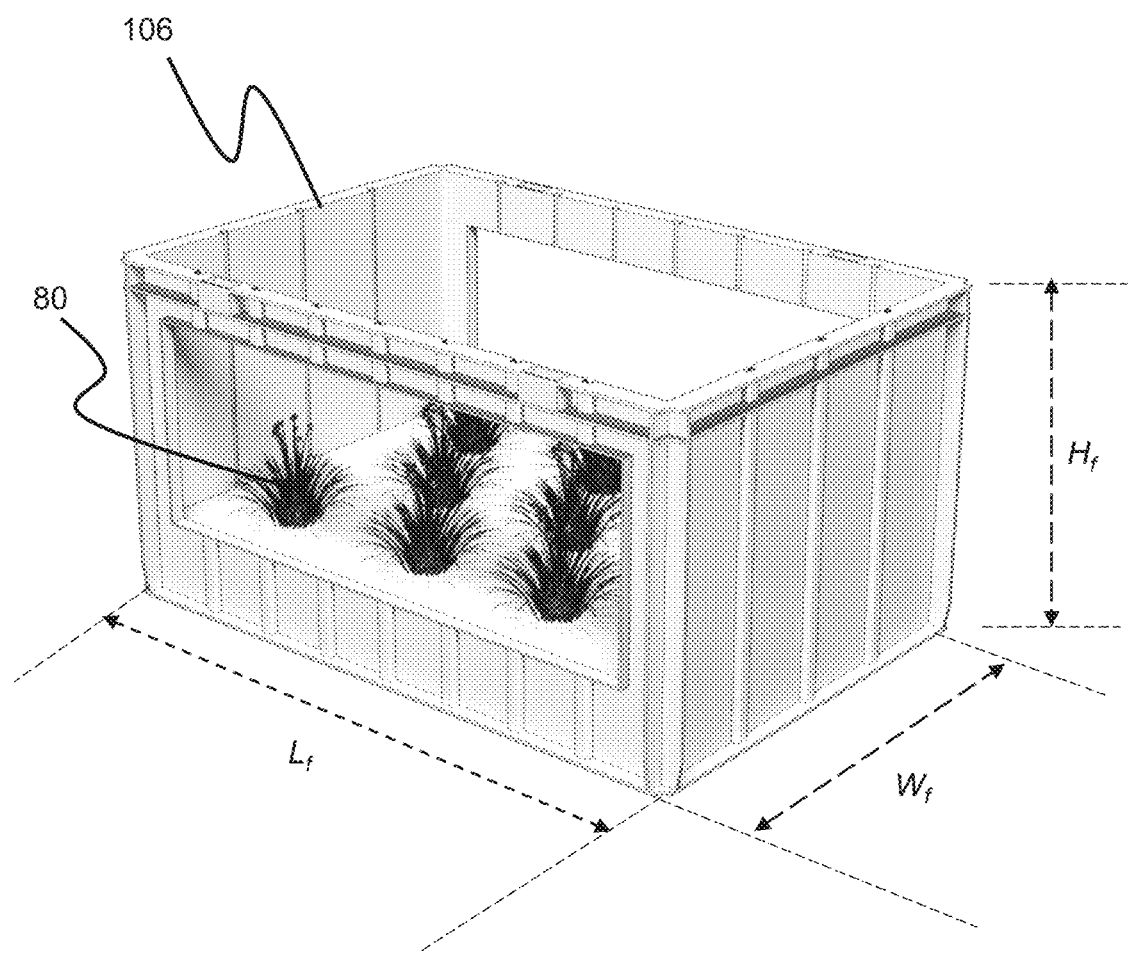
FIG. 5 is a perspective view of a container suitable for storing and cultivating crops.

FIG. 5 shows examples of plants 80 stored in a container 106 having height $H_f$, a width $W_f$ and a length $L_f$. To allow sufficient light for allowing cultivation of the plants 80, the container 106 is in this embodiment designed with openings on top and on two opposite vertical sides.

Figure 6:
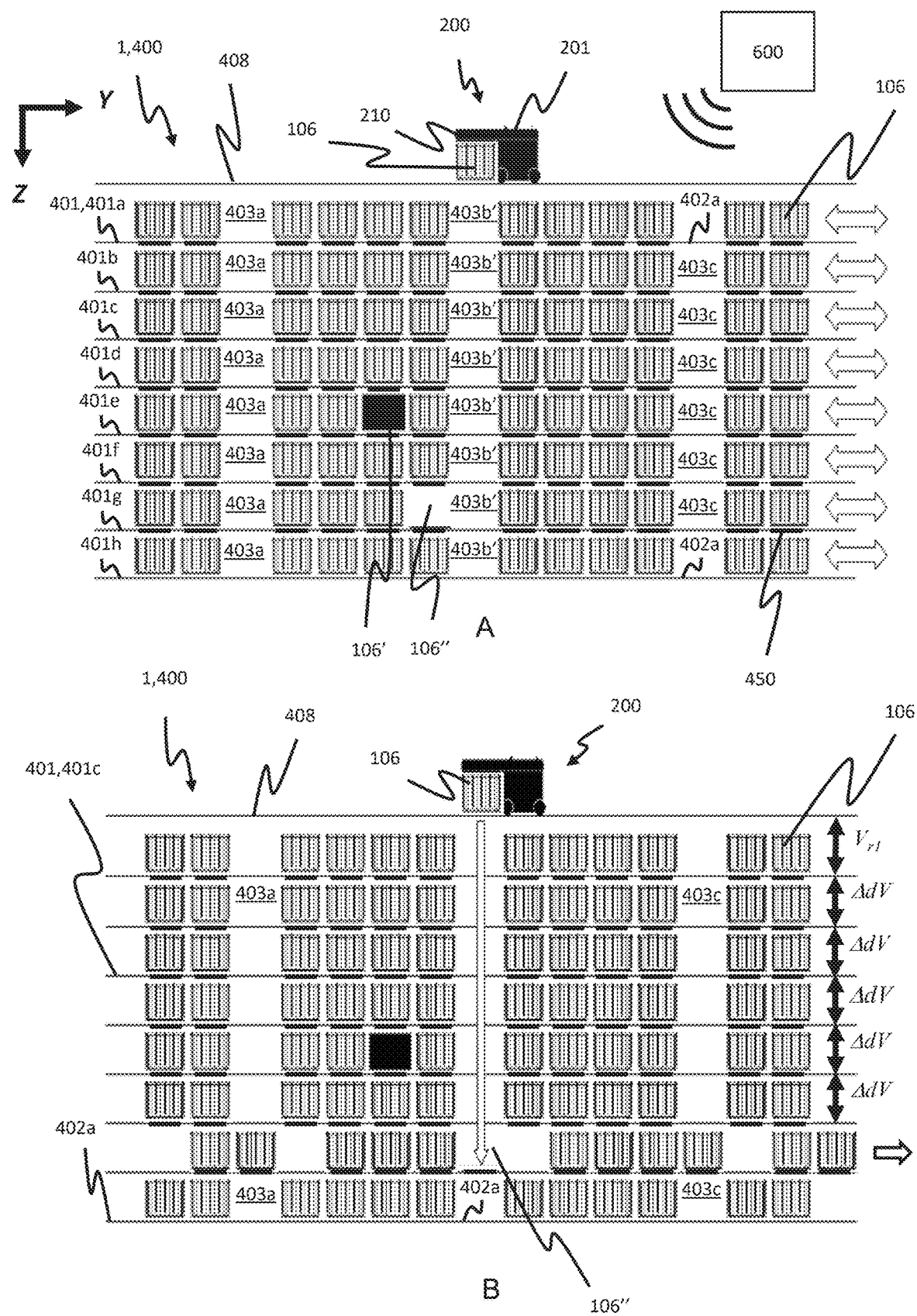
FIG. 6 is a side view of an automated storage and retrieval system with an illuminable storage grid in accordance with one embodiment of the invention, where
Figure 6:
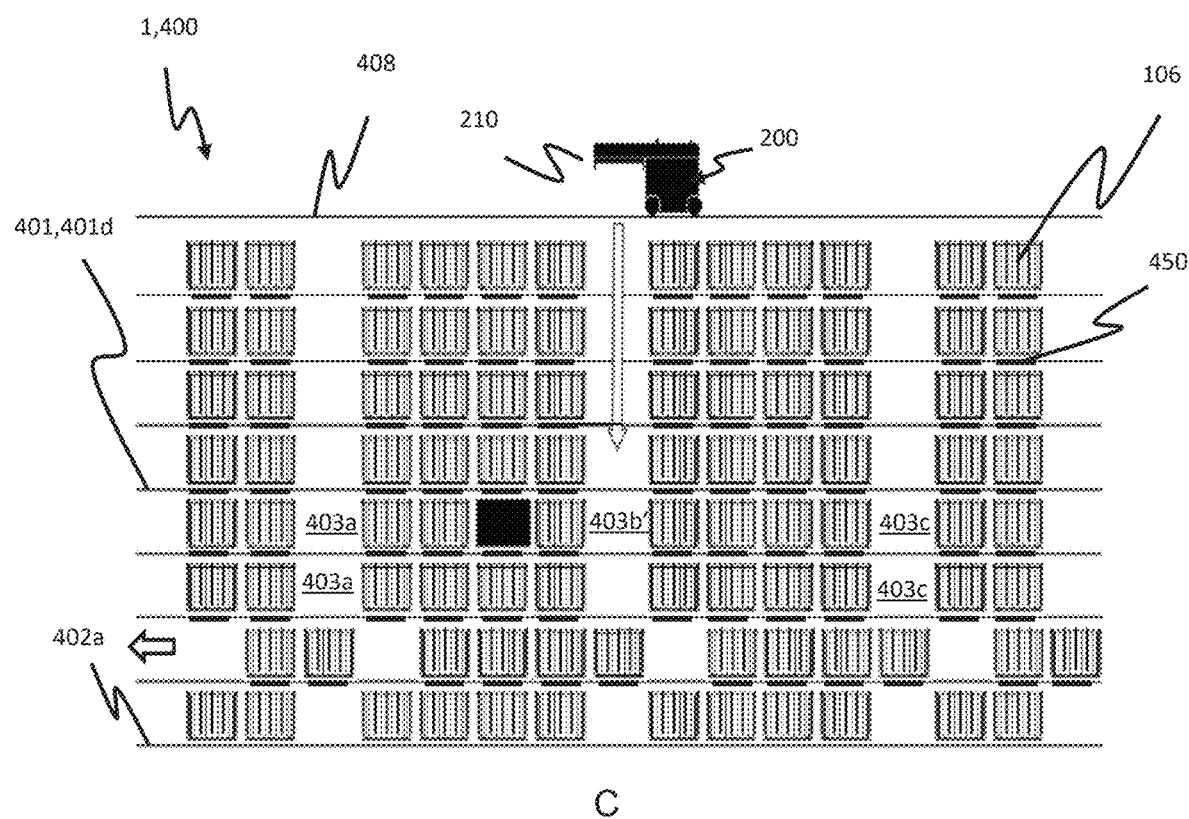
Figure 6:
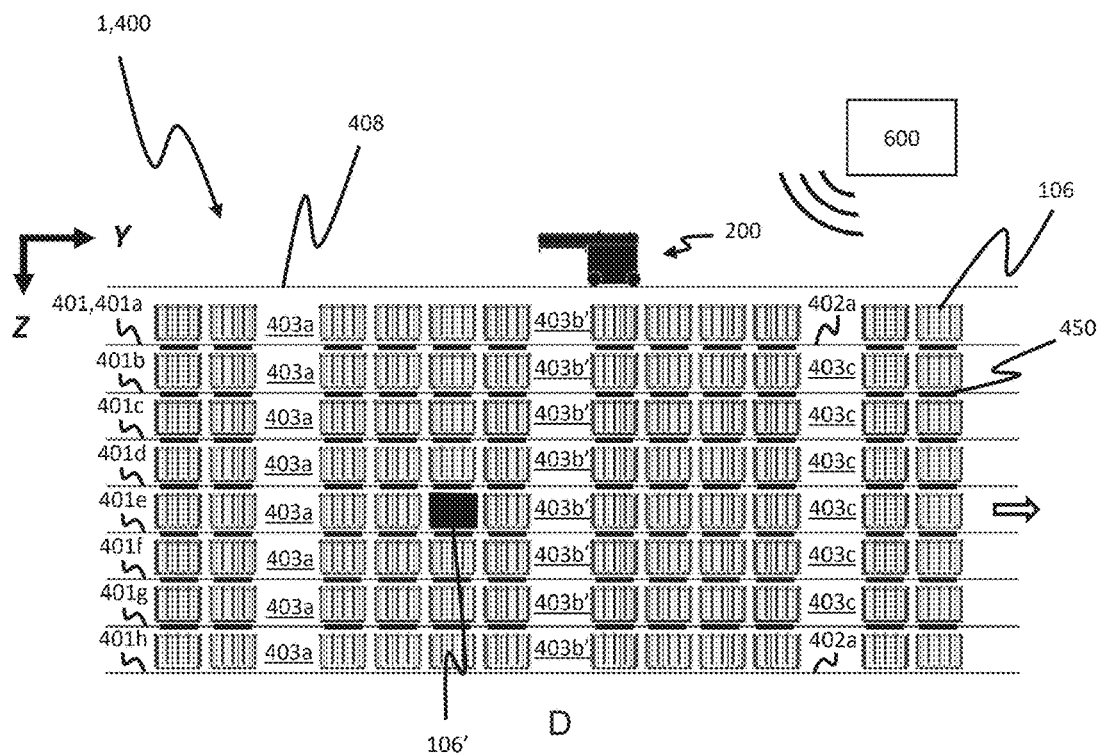
Figure 6:
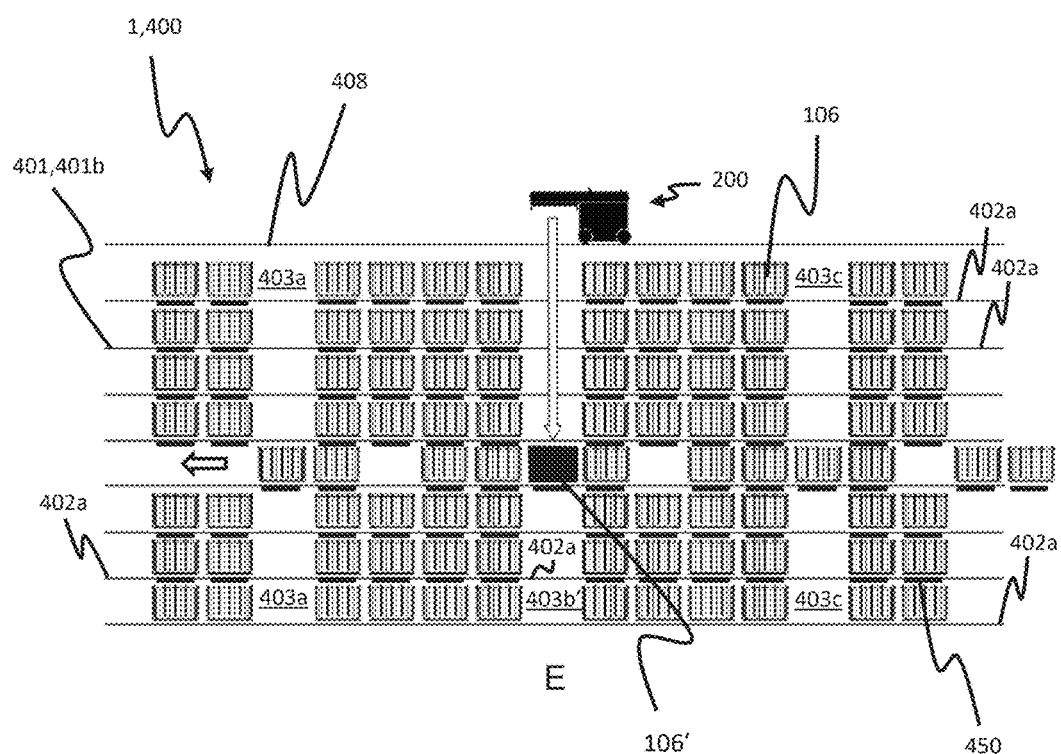
Figure 7:
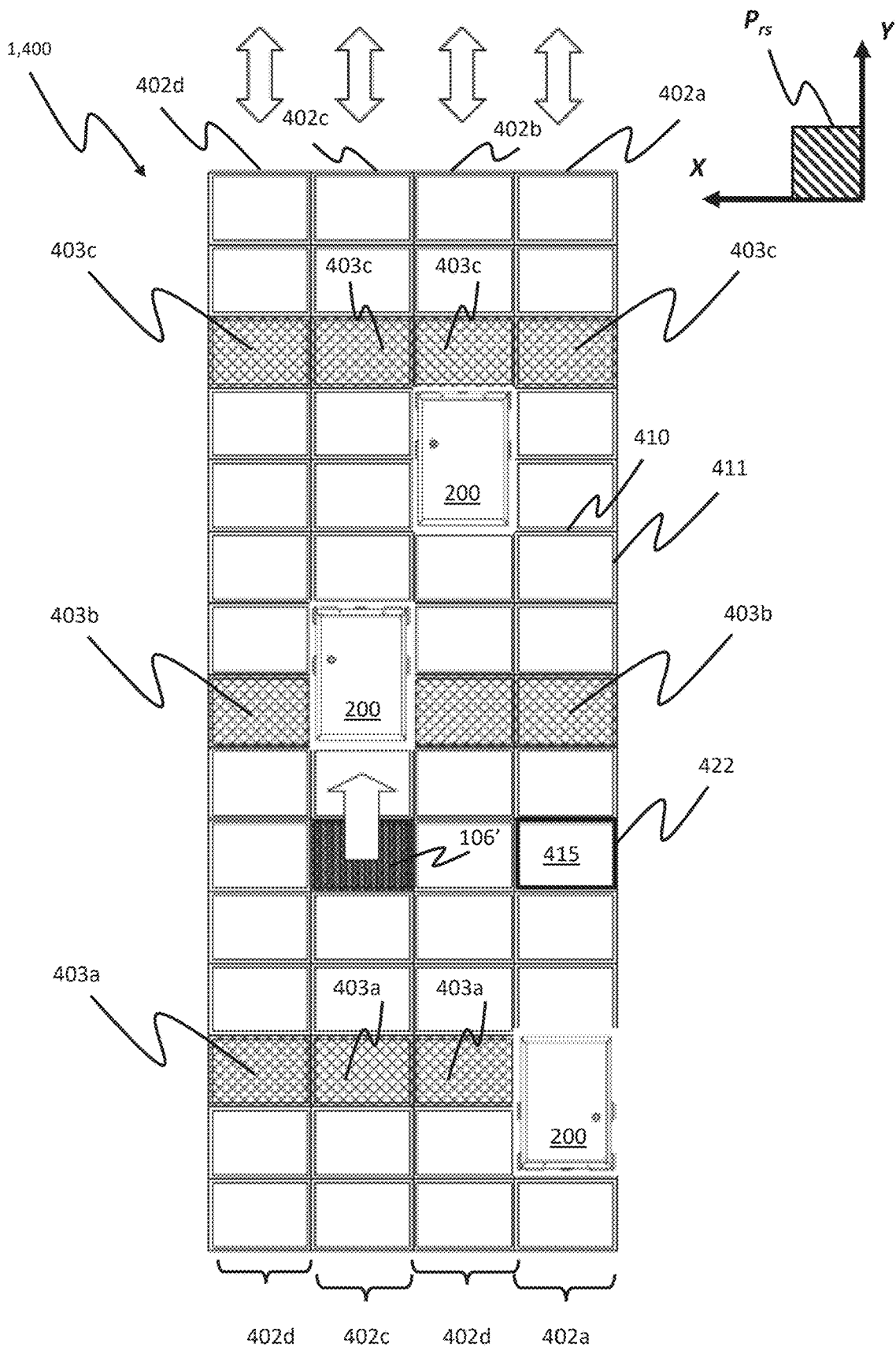
FIG. 7 is a top view of an automated storage and retrieval system in accordance with the storage system of FIG. 6.

With particular reference to FIG. 6 and FIG. 7, the inventive storage and retrieval system 1 with an illuminable storage grid 400 comprises remotely operated vehicles 200 operating on a rail system 408 comprising a first set of parallel rails 410 arranged to guide movements of the remotely operated vehicles 200 in a first direction X across the storage grid 400 and a second set of parallel rails 411 arranged perpendicular to the first set of rails 410 to guide movement of the remotely operated vehicles 200 in a second direction Y which is perpendicular to the first direction X. The containers 106 stored within the storage grid 400 are accessed by the remotely operated vehicles 200 through grid openings 415 in the rail system 408, where each grid opening 415 is enclosed by a grid cell 422. The rail system 408 extends in a horizontal plane $P_{rs}$.

As best seen in FIG. 6B, the containers 106 are stored on a plurality of horizontal container supporting frameworks 401a-h distributed in a Z direction below the rail system 408 with a vertical offset indicated by $V_{r1}$ (i.e. the offset between the lower edge of the rail system 408 and the lower edge for an uppermost framework 401a directly beneath the rail system 408) and a vertical offset indicated by ΔdV (i.e. the average offset between the lower edges of the deeper frameworks 401b-h).

The vertical offsets $V_{r1}$ and each ΔdV may be selected to provide a height that is equal or higher than a maximum height of one container 106 or a stack of several containers 106 within a specific framework 401. As an example, the uppermost framework 401a may be adapted to store stacks of containers 106 while the below situated frameworks 401b-k may be adapted to store single (unstacked) containers 106. As a further example, several or all frameworks 401 of the grid 400 may be adapted to store stacks of several storage containers 106. The different frameworks 401 of the same grid 400 may also be configured to store stacks of unequal numbers of containers 106. The vertical space (i.e. the available height) required for one or several frameworks 401 of the grid 400 to be adapted to store a stack of several containers 106 may be obtained by reducing the total number of frameworks 401 as compared to a configuration of the grid 400 where all frameworks 401 are adapted to store single (unstacked) containers 106.

FIGS. 6A-E show vertical cross-sections of one embodiment of a storage and retrieval system 1 comprising an illuminable storage grid 400 with equal spacings ΔdV between the different frameworks 401.

In FIG. 6A, a target container 106' and a vacant storage space 106" are located in different frameworks 401e,401g. The remotely operated vehicle 200 approaching to pick up the target container 106' typically brings another container 106 that is to be stored in the illuminable storage grid 400. Before the remotely operated vehicle 200 can pick up the target container 106', the vehicle held container 106 is advantageously placed in a vacant storage space 106" within the storage grid 400. This process is typically referred to as an exchange process. As further explained below, access to different frameworks 401a-h is achieved by holes 403 present within container supports 402 horizontally displaceable within some or all of the frameworks 401.

Figure 13:
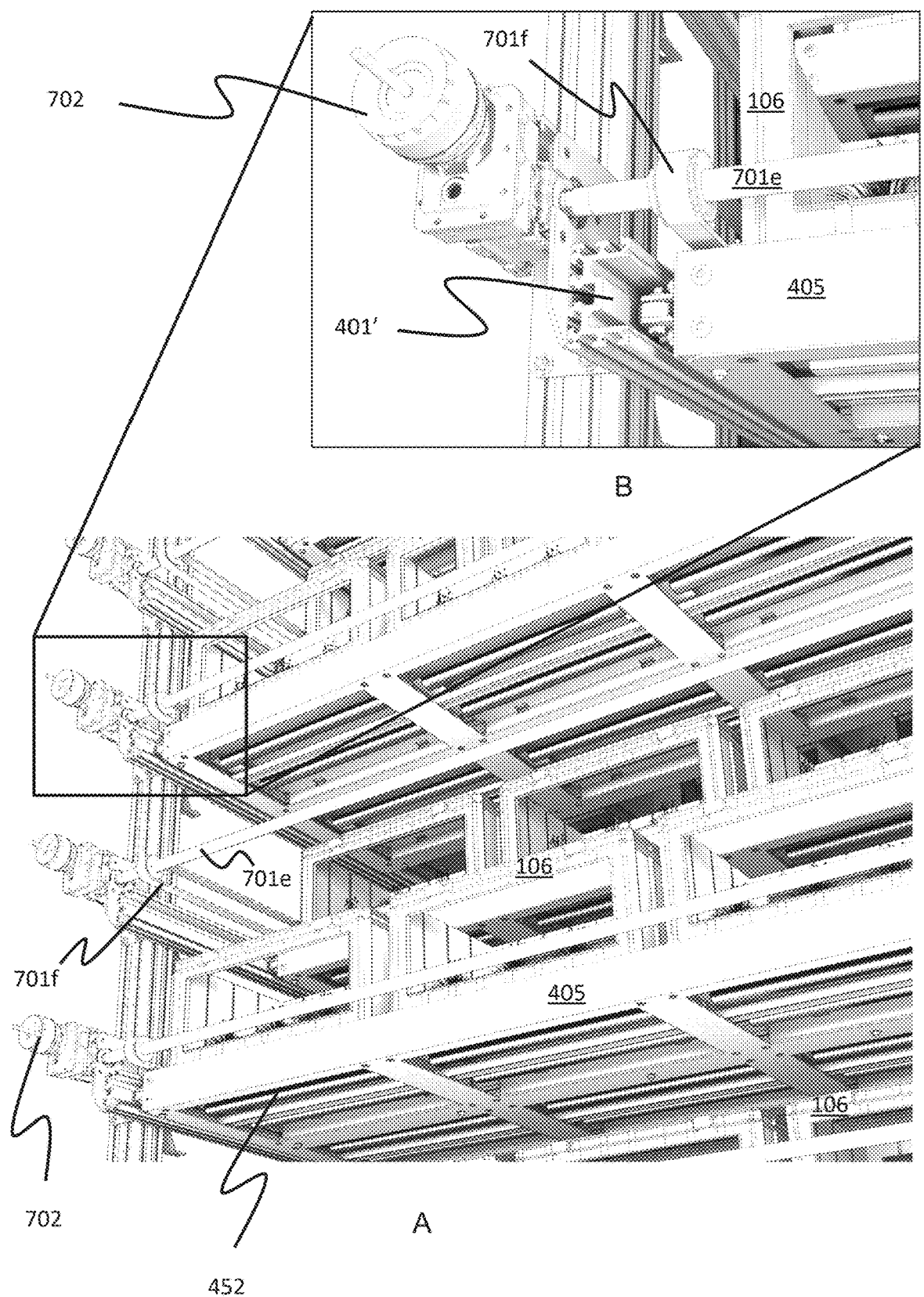

In FIG. 6B the container support 402 within framework 401g has been moved a distance of two grid cells 402 such that the vacant storage space 106" is in a position ready to receive the container 106 from the remotely operated vehicle 200. The vacant storage space 106" (into which the container 106 is to be placed) and the target container 106' are in a preferred case horizontally closest to the same target hole 403b'. In this way the vehicle 200 does not need to move between the two operations during the same exchange process. In an even more preferred case, the vacant storage space 106" and the target storage container 106' can be located on the same container support 402 (not shown in FIG. 6). In this way the necessary movements of the vehicle's lifting device 210 in the exchange process is kept to a minimum. The movement of the container support 402 may be performed by a support displacement device 700 such as a linear actuator (FIG. 9) and/or a belt driven system (FIG. 13).

FIG. 6C shows the storage system 1 where the container 106 earlier held by the vehicle 200 has been arranged into the previously vacant storage space 106". Further, the lifting device 210 has been retracted vertically above the container supporting framework 401e of the target container 106'. Consequently, the lifting device 210 has been sufficiently retracted so that displacement of the container support 402 with the target container 106' can proceed until the target container 106' is situated beneath the target hole(s) 403b' (FIG. 6D). By retracting the lifting device 210 only just above the position of the container supporting framework 401e of the target container 106', the exchange process becomes more time efficient.

FIG. 6D shows the storage system 1 with the vehicle 200 ready to lift the target container 106' after placing the formerly held storage container 106 into the vacant storage space 106", i.e. with its lifting device 210 arranged above the framework 401e supporting the target container 106'. The container support 402 of the previously vacant storage space 106", now occupied by the container 106, has been displaced back to its initial position. Displacement of the container support 402 of the target container 106' may now commence in order to align the target container 106' beneath the target hole(s) 403b'.

FIG. 6E shows the storage system 1 with the target container 106' arranged beneath the target hole(s) 403b', i.e. in a position ready to be lifted by the lifting device 210 of the vehicle 200.

After the target storage container 106' has been lifted above the container supporting framework 401e, the container support 402 can be displaced back to its initial position.

For the specific embodiment depicted in FIGS. 6 and 7, each framework 401a-h comprises several elongated container supports 402a-d having their longitudinal orientation in the Y direction and arranged parallel to each other in the X direction.

The container supports 402a-d in each framework 401a-k displays holes 403a-c distributed along the Y direction, where each hole 403a-c has a cross sectional area being at least the cross-sectional area of a container 106, i.e. at least $W_f \times L_f$ (see FIG. 5).

The containers 106 are placed on top of removable illumination units 450 arranged side by side between these holes 403a-c and stabilized in the horizontal plane $P_{rs}$ by X ribs 405 and Y ribs 406 framing the illumination units 450 along the X direction and the Y direction. Such X and Y ribs 405,406 may preferably also protrude upwards from each of the illumination units 440 to prevent the containers 106 to move horizontally relative to the container support 402.

As shown in FIG. 7, the different container supports 402a-d may be moved a distance in the Y-direction corresponding to an integer number of grid cells by use of the displacement device 700.

Figure 8:
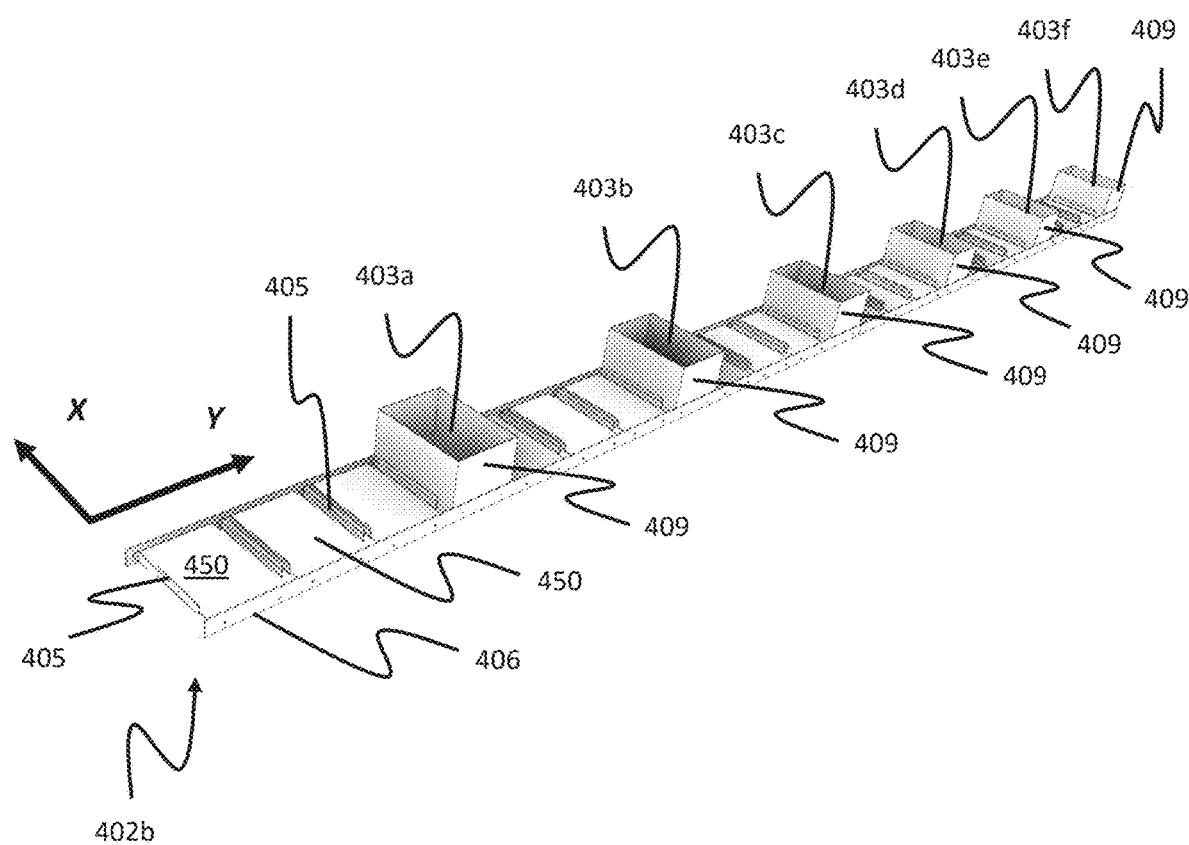
FIG. 8 is a perspective view of a possible configuration of a single container support having a plurality of holes/openings.

FIG. 8 shows an example of a single container support 402b having an elongated shape with a width in the X direction allowing placement of a single container 106 of length $L_f$. In this particular configuration, the Y rib 406 extend along the full length of the container support 402b and the X ribs 405 extends along the length of each container illumination unit 450.

The illumination units 450 may be supported on lower lips of the X ribs and/or the Y-ribs (not shown).

The container support 402b displays holes 403a-f along the Y direction after each third illumination unit 450. Each hole 403a-f has a width and length in the X and Y directions, respectively, being slightly larger than the length $L_f$ and width $W_f$ of the container 106. A container guiding structure 409 in form of a bottomless box is fixed along the peripherals of each hole 403a-f in order for the container 106 to be guiding correctly through the hole 403a-f during lifting/lowering by the respective vehicles 200.

In order to store and retrieve a target container 106' using the above described embodiment, the following operations are performed, with particular reference to FIGS. 6D and E:

The control system 600 gives instructions to the vehicle 200 to pick up a target container 106' with coordinates $[X_{tc}, Y_{tc}, Z_{tc}]$. This position corresponds to a container 106 supported on an illumination unit 450 of a container support 402a forming part of a horizontal container support framework 401e at a depth of $3 \times \Delta dV + V_{r1}$ below the rail system 408. The target container 106 is separated in the Y direction to a nearest hole 403b' (i.e. the target hole) by one non-target container 106 at position $[X_{tc}, Y_{tc}+1, Z_{tc}]$. All the holes 403 in the storage grid 400 are initially vertically aligned, that is, the X-Y position of the target hole 403b' of the container support framework 401a adjacent the rail system 408, i.e. $[X_{tc}, Y_{tc}+2]$ is equal to the X-Y positions of the target holes 403b' of the underlying container support frameworks 401b-h.

Figure 2:
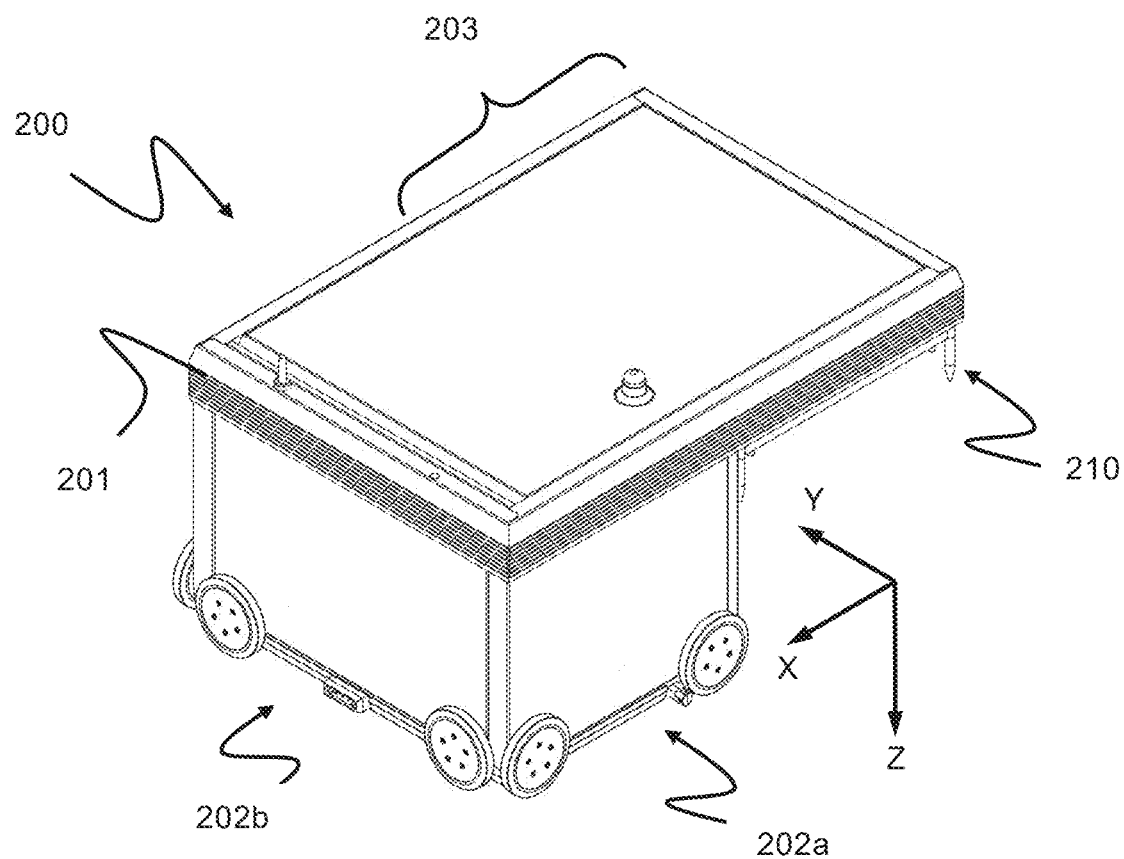
FIG. 2 is a perspective view of a prior art remotely operating vehicle having a cantilever for carrying containers underneath.
Figure 3:
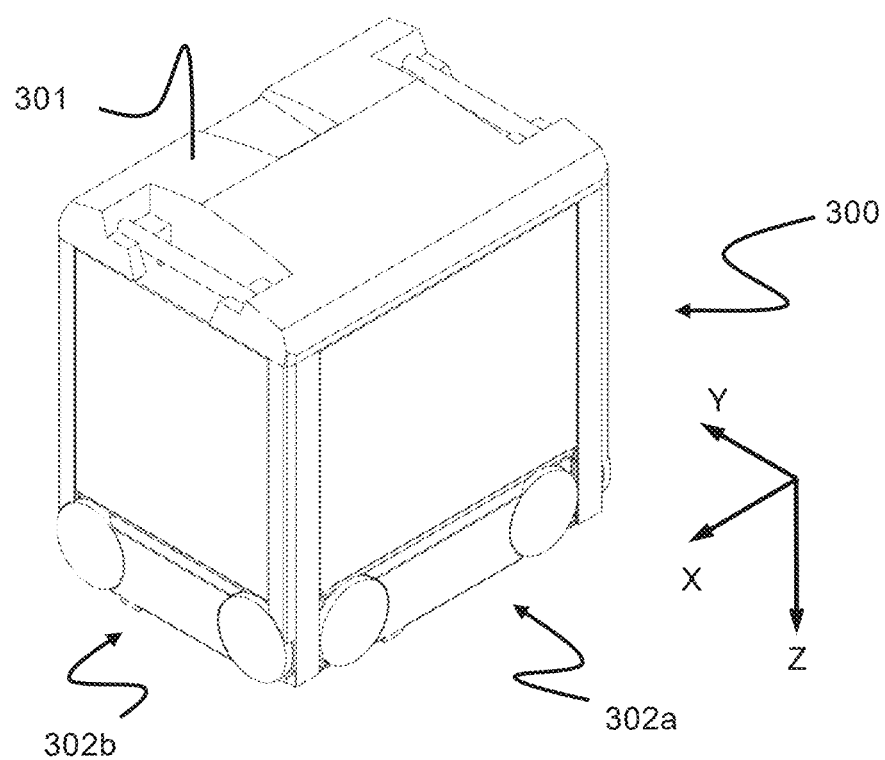
FIG. 3 is a perspective view of a prior art remotely operating vehicle having a centrally arranged cavity for carrying containers therein.
Figure 4:
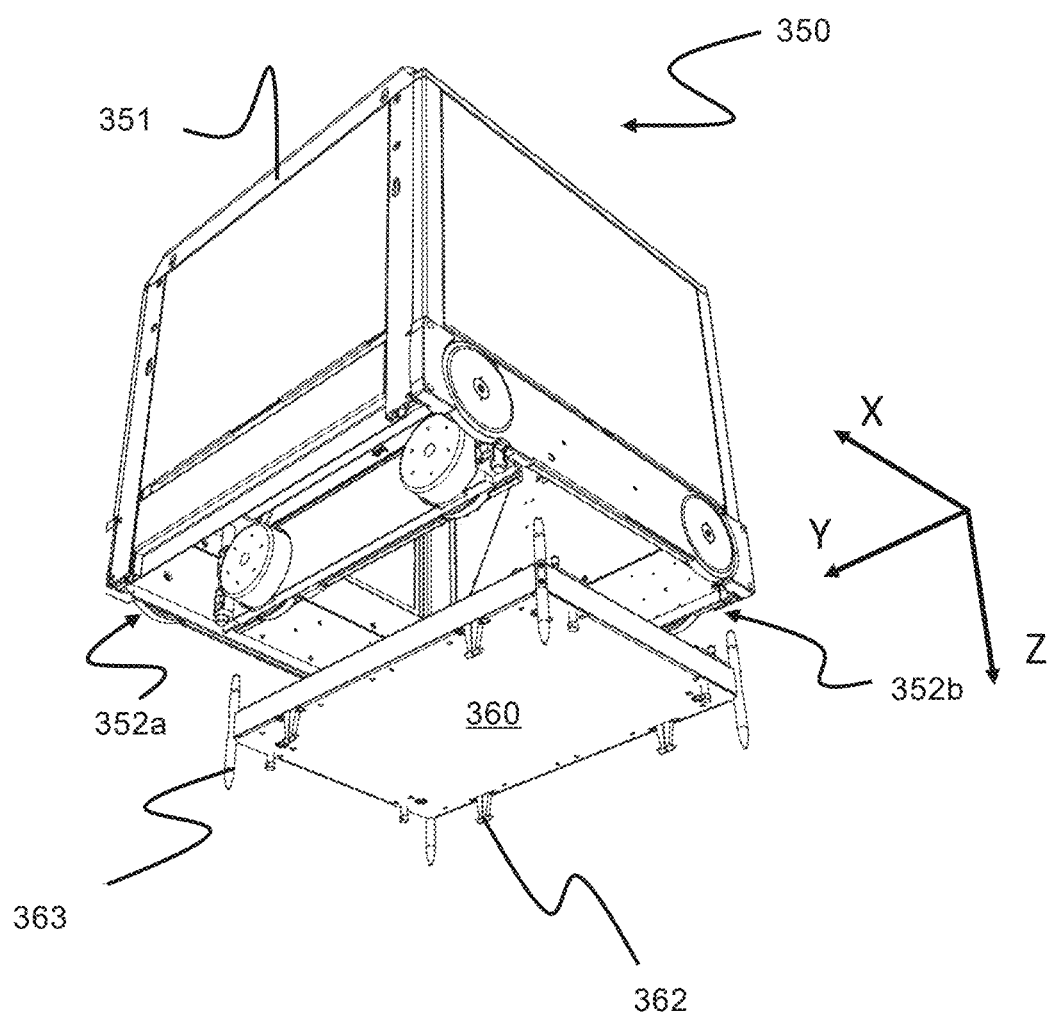
FIG. 4 is a perspective view of a prior art remotely operating vehicle having an internally arranged cavity for carrying containers therein, wherein the cavity is offset from center relative to the X-direction.

The vehicle 200 moves by aid of its drive means 202a,b (FIG. 2) in the X and Y directions until its lifting device 210 is located directly above the target hole 403b' situated closest in horizontal direction to the target container 106'.

During and/or after movement of the vehicle 200 to the position above the target hole 403b', the control system 600 sends an instruction to a support displacement device 700 (see FIGS. 9 and 13) to displace the container support 402a of the container framework 401e a sufficient distance in the Y direction so that the target container 106' is vertically aligned with the target holes 403b' of the corresponding container supports 402a of the above situated container frameworks 401a-d.

During and/or after the displacement of the container support 402a, the lifting device 210 of the vehicle 200 is activated and lowered down through the grip opening 415 and the vertically aligned target holes 403b' until the gripping part of the lifting device 210 is in position to grip the target container 106.

After the target container 106' has been gripped by the lifting device 210 and lifted above the above situated container framework 401d, the support displacement device 700 is again activated to move the container support 402a back to its initial Y position, i.e. to position [$X_{tc}, Y_{tc}, Z_{tc}$].

When the target container 106' has been lifted above the rail system 408, the vehicle 200 is moved to another location on the rail system 408, for example to a dedicated port column/chute for delivery to an access station.

This exchange process has the advantage that the need for digging performed for prior art storage and retrieval system is no longer necessary.

The inventive storage grid 400 can be of any size. In particular it is understood that the the storage grid 400 can be considerably wider and/or longer and/or deeper than the size disclosed in the accompanied figures. For example, the storage grid 400 may have a horizontal extent with room for more than 700×700 containers and a storage depth of more than twelve containers.

Figure 9:
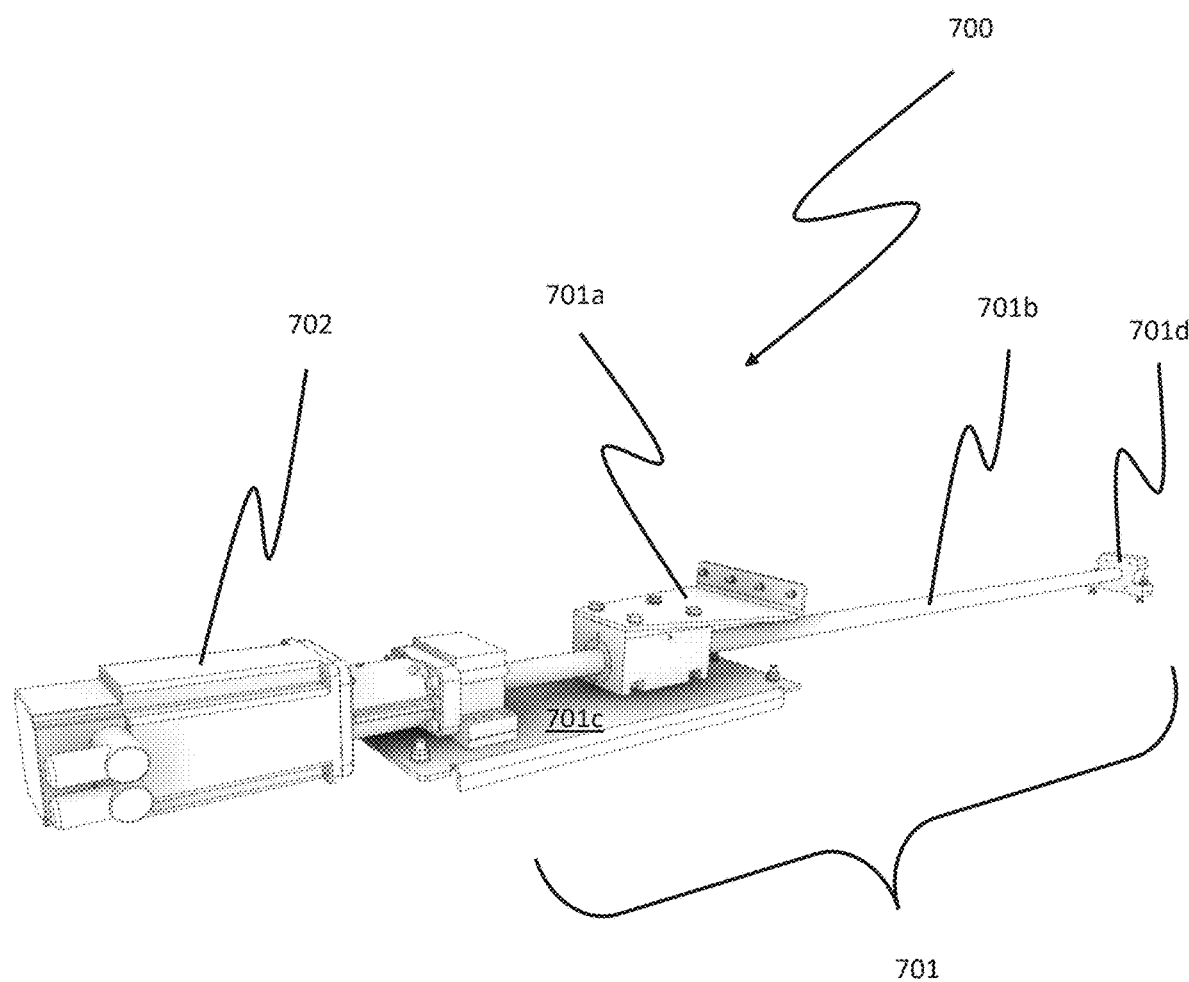
FIG. 9 is a perspective view of a linear activator for displacing a container support.
Figure 10:
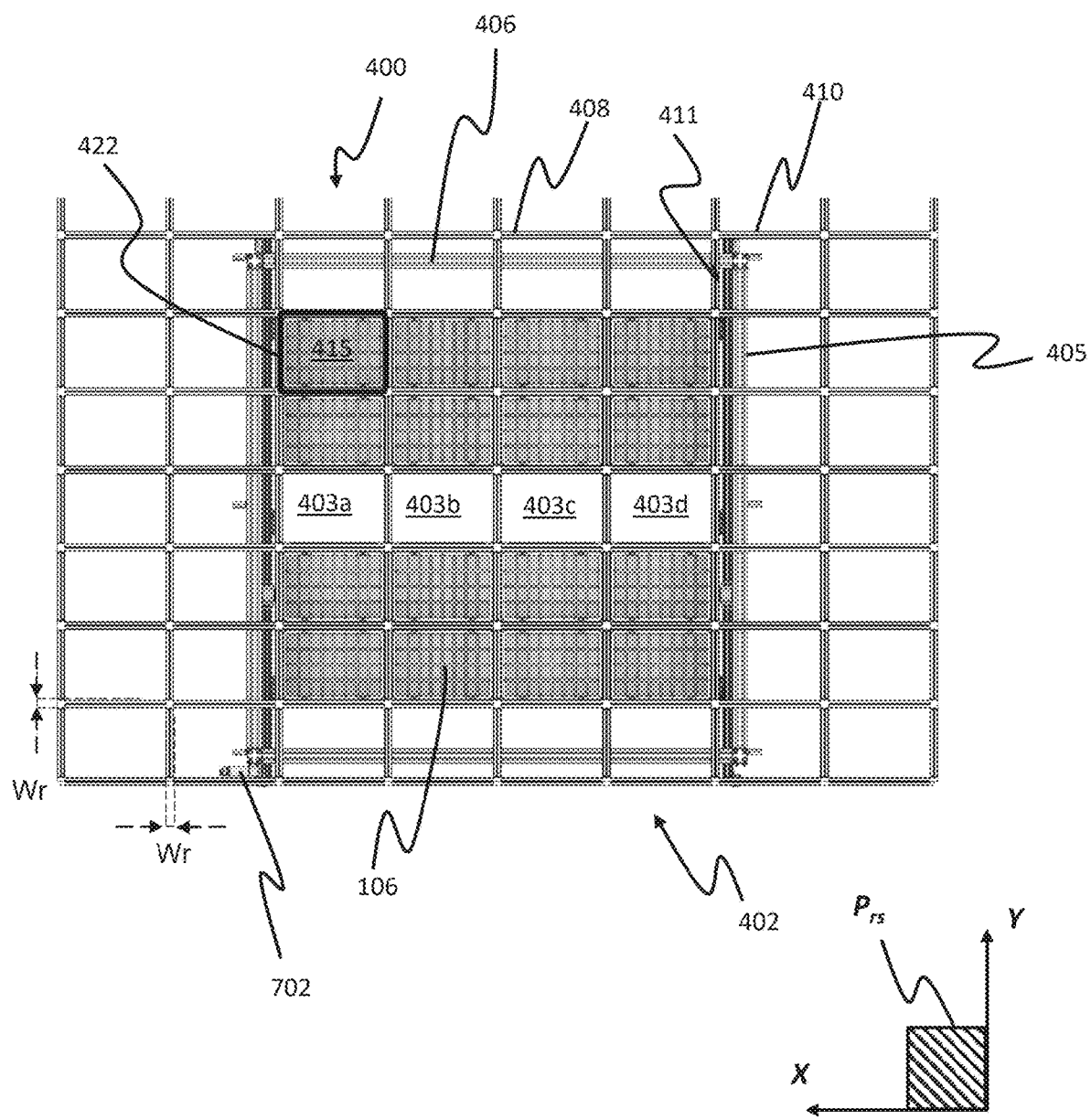
FIG. 10 is a top view of an illuminable storage grid below a rail system, where all container supports are vertically aligned relative to each other and to grid cells of the rail system.

A specific example of a displacement device 700 is shown in FIG. 9. The displacement of the container supports 402a-d (individually or collectively) is achieved by a mechanical linear actuator (ball screw) that translates rotational motion to linear motion. A threaded shaft 701b provides a helical raceway for ball bearings which act as a precision screw. The required rotation of the shaft 701b is achieved by an electric motor 702 connected to one of the shaft's end. A stopper 701d is fixed to the opposite end of the shaft 701b. Furthermore, a slider 701a is coupled to the rotational shaft 701b such that the slider 701a moves along the shaft 701b during rotation. By attaching the slider 701a to the end of the container support 402a-d, the desired displacement in the Y direction is achieved. The displacement mechanism 700 is supported to the storage grid 400 by a support plate 701c.

One way of installing an inventive illuminable storage grid 400 as described above can be to remove all stacks of containers 106 beneath a rail system 108 of at least part of a prior art storage and retrieval system as shown in FIG. 1, and to mount the container supporting frameworks 401, the container supports 402 and the displacement mechanism 700 within the empty volume.

FIGS. 10-14 shows a second embodiment of the illuminable storage grid 400.

As for the first embodiment the inventive storage and retrieval system 1 comprises remotely operated vehicles 200 operating on a rail system 408 comprising a first set of parallel rails 410 arranged to guide movements of the remotely operated vehicles 200 in a first direction X across the underlying container supporting frameworks 401 and a second set of parallel rails 411 arranged perpendicular to the first set of rails 410 to guide movement of the remotely operated vehicles 200 in a second direction Y which is perpendicular to the first direction X. The containers 106 stored within the storage grid 400 are accessed by the remotely operated vehicles 200 through grid openings 415 in the rail system 408, wherein each grid opening 415 is enclosed by a grid cell 422. The rail system 408 extends in a horizontal plane $P_{rs}$ set up by the X and Y directions.

Figure 11:
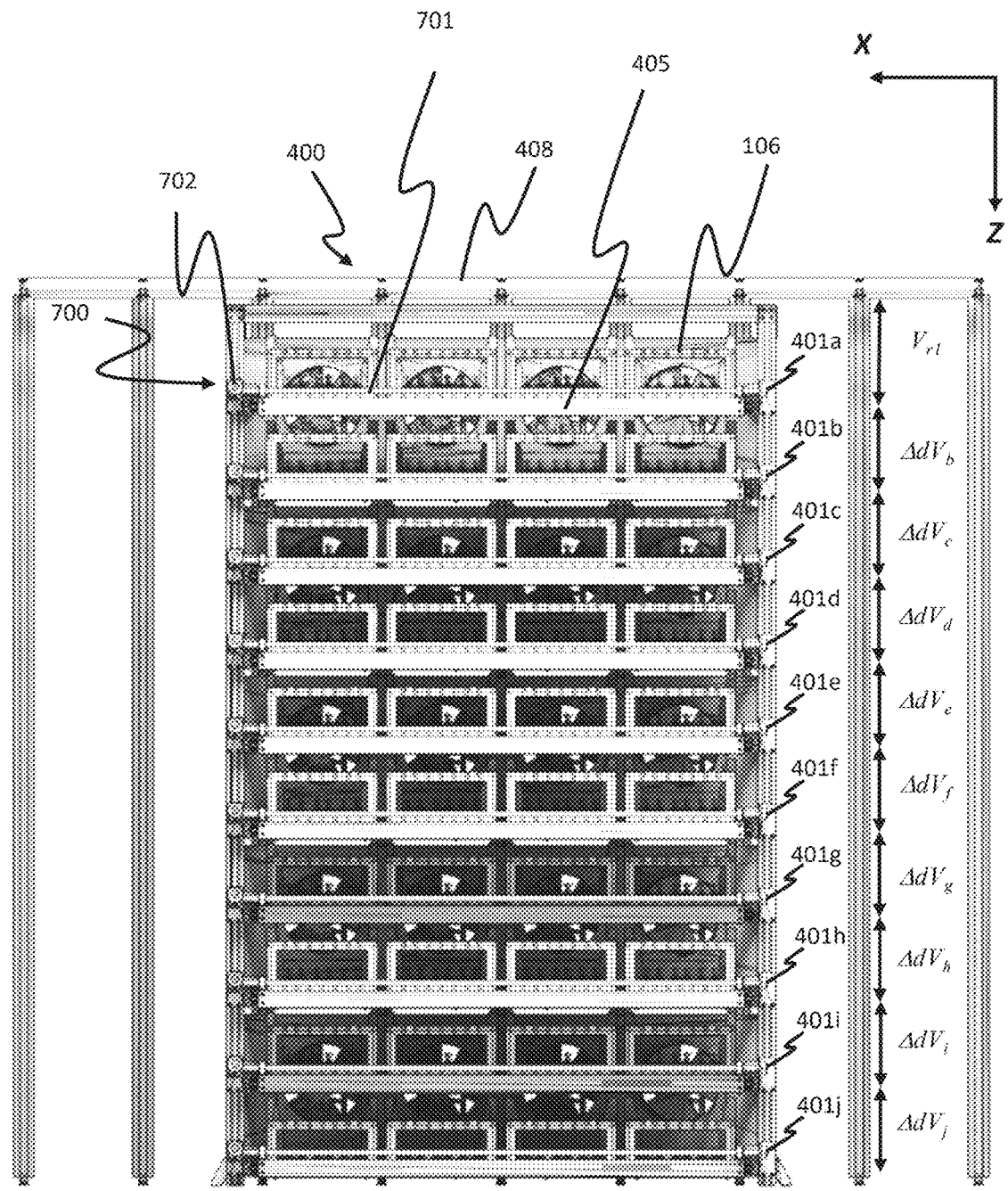
FIG. 11 is a side view of the illuminable storage grid of FIG. 10.
Figure 12:
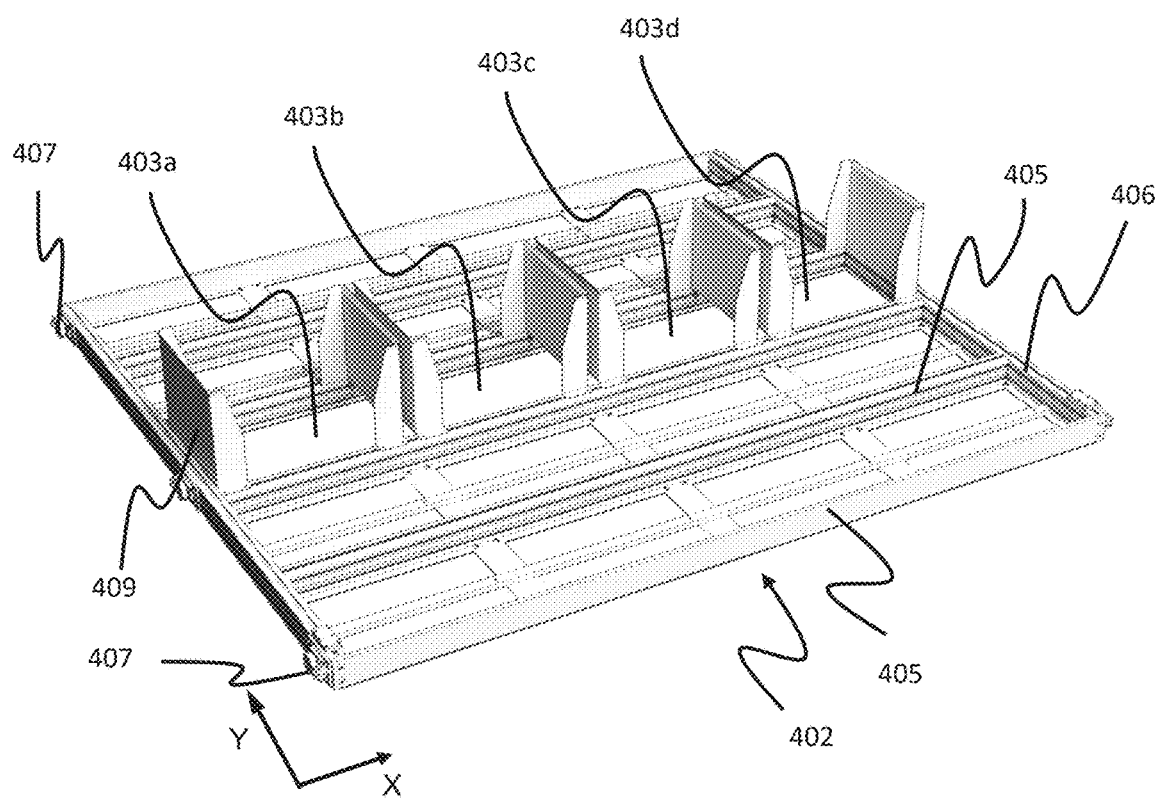
FIG. 12 is a perspective view of a single illuminable container support configured as a matrix of container spaces surrounding both sides of a row of holes arranged in along the X direction, wherein FIGS. 12A, B and C show the container support without containers and without illumination units, the container support with illumination units and without containers and the container support with illumination units and with containers, respectively.
Figure 12:
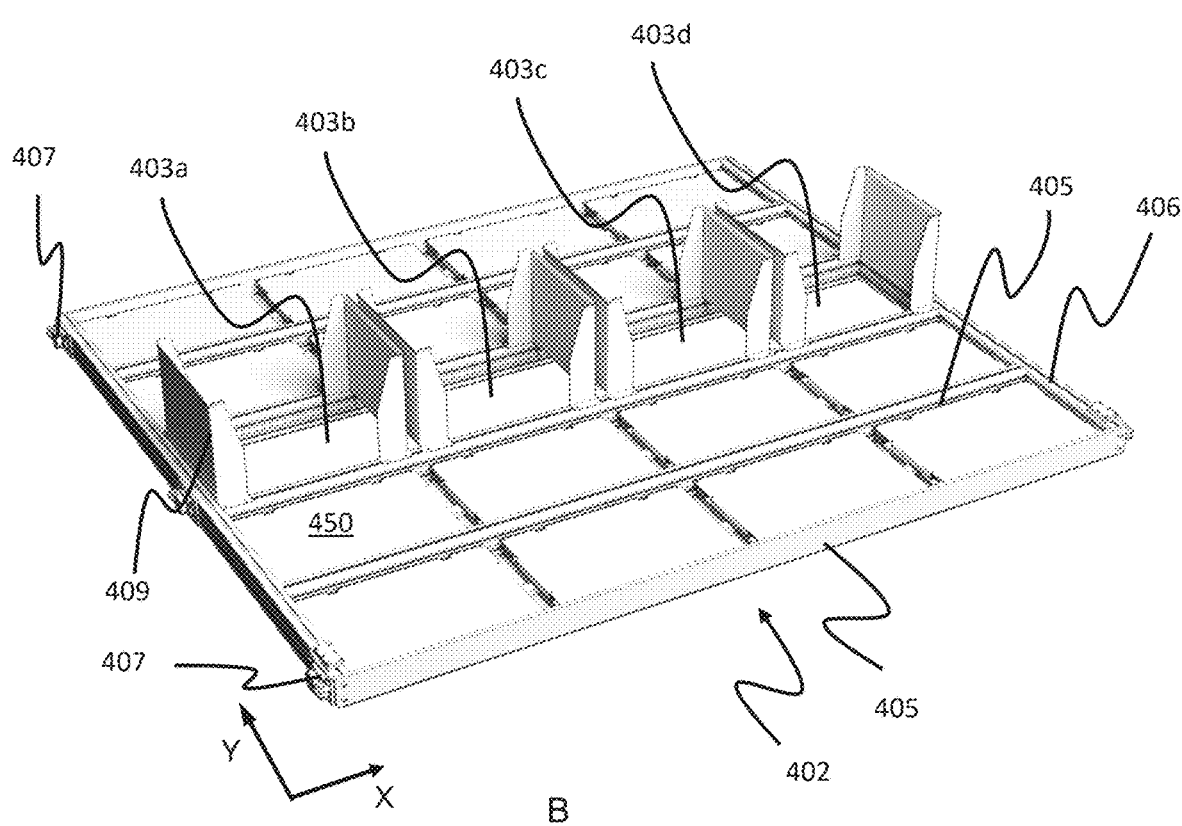
Figure 12:
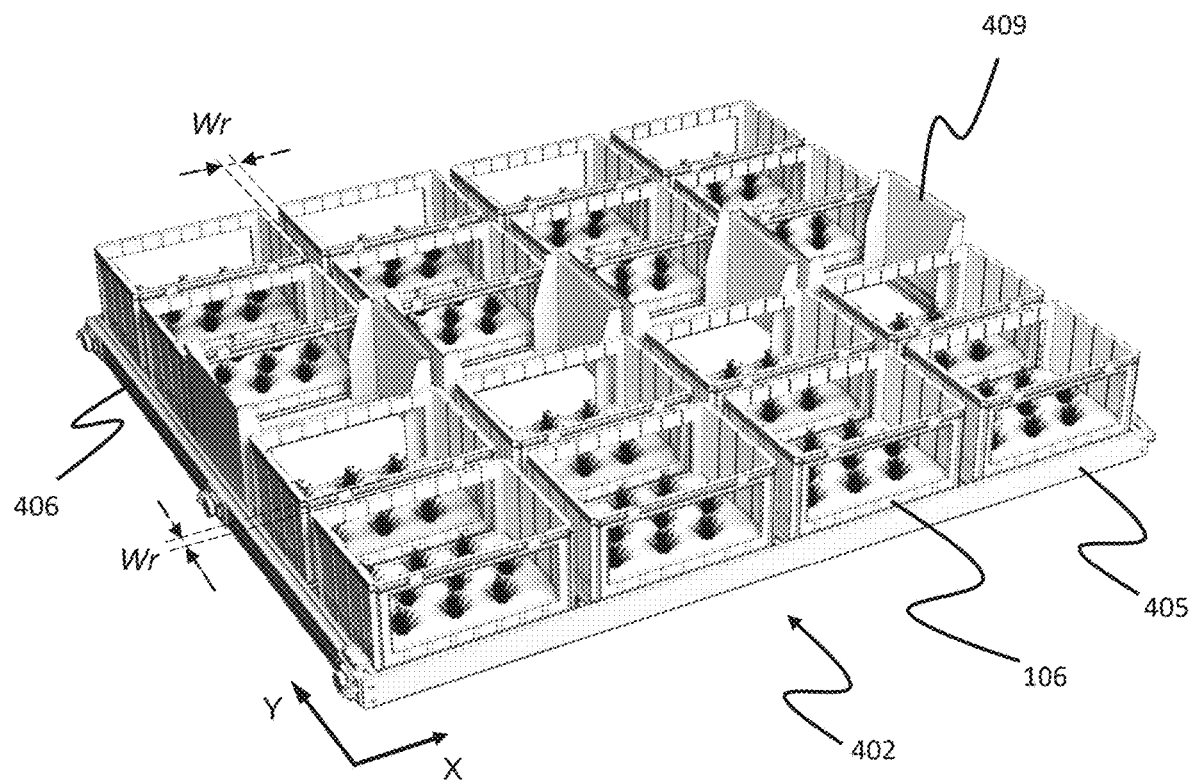

As best seen in FIG. 11 showing a side view of the second embodiment storage grid 400, the containers 106 are (as for the first embodiment) stored on a plurality of horizontally container supporting frameworks 401 distributed in a Z direction below the rail system 408 with a vertical offset indicated by $V_{r1}$ and a vertical offset indicated by $\Delta dV_{b-j}$.

However, in contrast to the first embodiment, each container supporting framework 401a-j comprises a horizontally extending container support 402 allowing support of a plurality of containers 106 in both X direction and Y direction. FIG. 11-14 illustrates an exemplary configuration of the second embodiment having a single container support 402 at each framework 401a-j, where each of these single container supports 402 may be displaced horizontally by a single displacement mechanism 700.

FIGS. 12A and B show an example of a container support 402 in accordance with the second embodiment without and with containers 106, respectively. The total size of the container support 402 and the widths of the X and Y ribs 405,406 are chosen such that the containers 106 are spaced apart by a distance Wr in both X and Y directions.

As for the container support shown in FIG. 8, the container support 402 of FIGS. 12A and B comprises a plurality of guide structures 409 for the openings 403. The guide structure 409 is fixed along the peripherals of each opening 403a-d in order to aid the storage container 106 to be guided correctly through the opening 403a-d during lifting/lowering by the vehicles 201.

The X and Y ribs 405,406 may have lower lips onto which the illumination units 450 may be supporting. The containers 106 are placed on top of the removable illumination units 450.

In the example of FIGS. 12A and B, the container support 402 has a matrix of container spaces comprising four rows and five columns. The horizontal extent of this matrix is a distance substantially equal to $4*L_f$ along the first direction X and a distance substantially equal to $5*W_f$ along the second direction Y. Any spacing Wr of the containers 106 should be added to the size of the matrix of container spaces. The container support 402 in FIGS. 12A and B have a central line of openings 403, e.g. four openings 403 along a column. Alternatively, the container support 402 may have one single opening 403 extending through all four rows. In yet another alternative configuration, the container support 402 may have a combination of openings 403 extending through one, two or three rows.

The X ribs 405, the Y ribs 406 and any other components associated with the container support 402 may be connected to each other by means of fasteners, welding, snap lock systems, tongue and groove system or other known methods know to those skilled in the art.

FIG. 13 shows an example of a displacement mechanism 700 for a container support 402 of the second embodiment for horizontal displacement in the Y direction relative to the container supporting framework 401.

The support displacement device 700 in FIG. 13 comprises a displacement motor 702 such as an electric motor. The electric motor 702 is arranged on the container supporting framework 401 by means of a bracket. The bracket can e.g. be connected to vertical pillars 430 of the storage grid 400.

The support displacement device 700 further comprises a rotational axle 701e configured to be driven by the electric motor 701. The drive shaft 702 is also configured to drive, i.e. displace, the displaceable container support 402 by attaching chains or belts 701f therebetween.

The direction of displacement of the container support 402 depends on the direction of rotation of the drive shaft 702 and thus the direction of rotation of the electric motor 701.

For maintenance purposes, the components of the support displacement device 700 are preferably arranged in positions easily accessible for technicians. In particular the electric motors 701 (or alternative drive devices) should preferably be arranged on the edge of each container supporting framework 401 and be extending on the outside of the container supporting framework 401. By arranging the electric motors 701 of adjoining container supporting frameworks 401 on opposite sides of the container supporting frameworks 401, more space is made available for the technicians to install or perform maintenance on the electric motor 701 and/or the support displacement device 700.

To be displaceable along the second horizontal direction Y, each container supporting framework 401 comprises a guide track 401' oriented in the Y direction and the corresponding container support 402 comprises a plurality of support frame wheels 407 mounted on the Y ribs 406, wherein the wheels 407 are configured to travel along the guide track 401'. In an alternative configuration, the guide track 401' may be provided on the container support 402 and the wheels 407 may be provided on the container supporting framework 401. As best shown in FIG. 13B, the guide tracks 401' may be extruded profiles.

FIG. 13A also shows a plurality of illumination units 450 constituting part of each container supporting framework. Each illumination unit 450 comprises an illumination frame 453 acting as support for containers 106 at the frame's upper side and an illumination source 452 such as LEDs arranged at the frame's lower side. Hence, since the containers 106 are vertically aligned within the storage grid 400, the illumination sources 452 are situated directly above each of those containers 106 arranged on the nearest lower lying container supports 402, thereby providing illumination onto the crops/plants 80 for cultivation.

Figure 14:
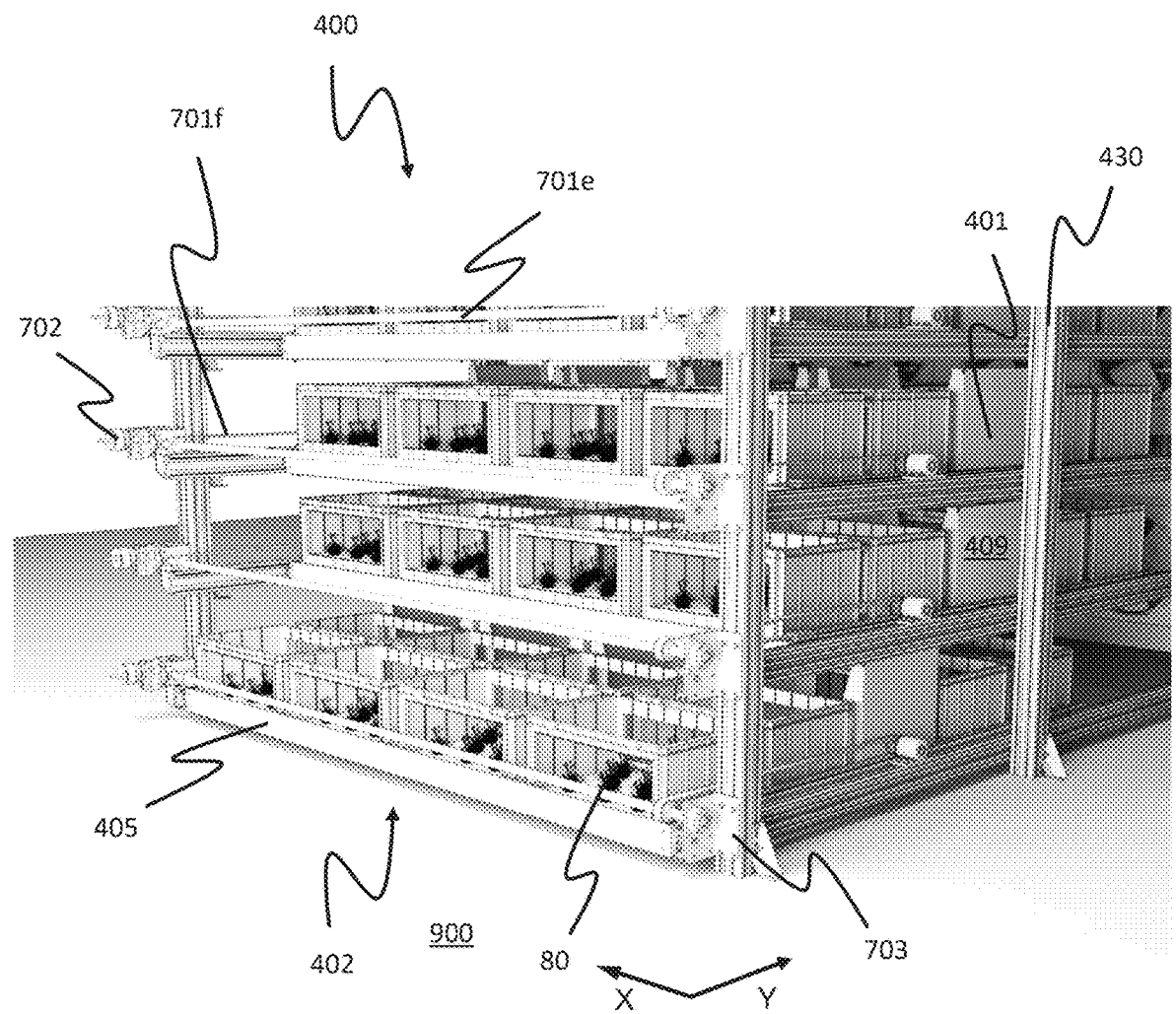
FIG. 14 is a perspective view of part of an exemplary illuminable storage grid according to the invention, where container support(s) in all container supporting frameworks above the container support(s) of the lowermost container supporting framework are displaced to provide access to lowermost containers.

FIG. 14 is a perspective view of a lowermost part of the storage grid 400. In this configuration, either the lowermost container support 402n is displaced relative to the above container supports 402a-i in other for above arranged vehicles 200,300,350 to gain access through vertically aligned holes 403 or free space over container support peripheries, or all the above container supports 402a-i are displaced relative to the lowermost container support 402n for the same purpose.

The lowermost container support 402n, or the above container supports 402a-i, is/are displaced a distance in the second direction Y corresponding to one grid cell 422.

In FIG. 14 it is shown that the storage grid 400 comprises a plurality of vertical pillars 430 supported by a floor or an elevated support 900. The connection to the floor/platform 900 may be achieved by means of pillar brackets 435.

Figure 15:
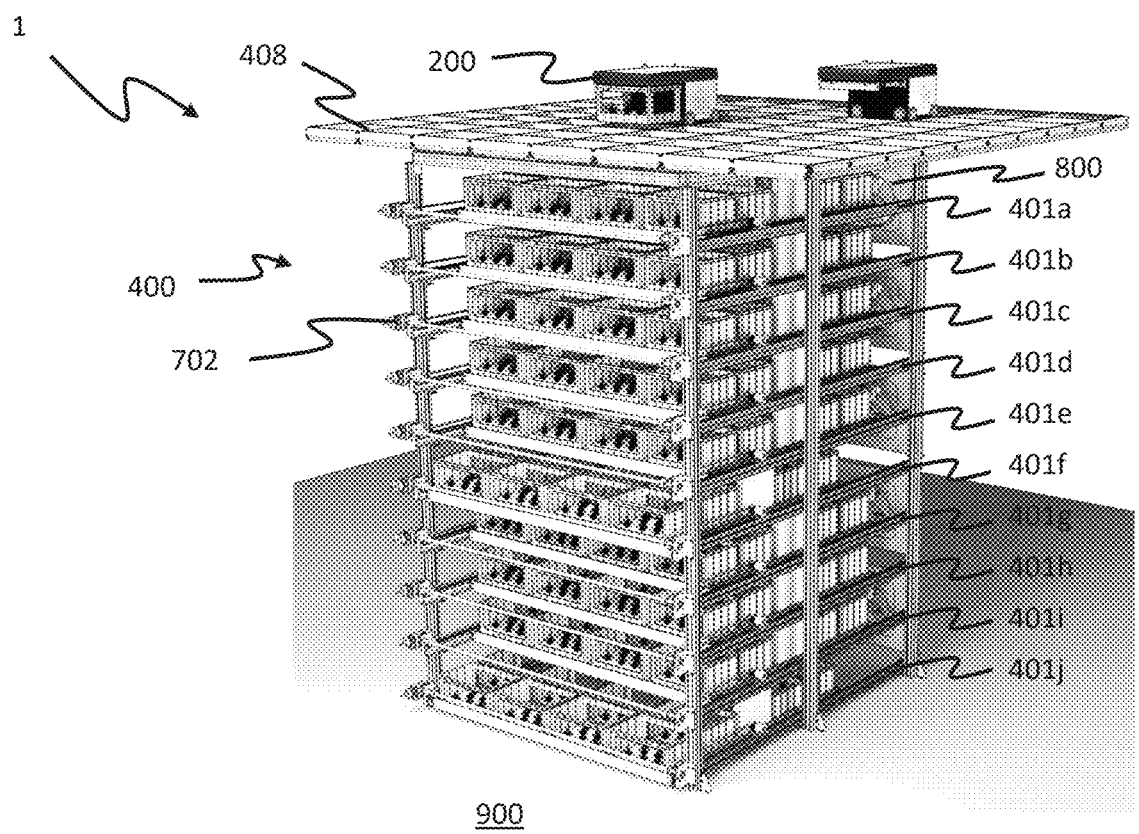
FIG. 15 is a perspective view of the storage grid of FIGS. 11-14, where some of the container supports are displaced in opposite directions in order for the remotely operating vehicles to access a target container or an illumination unit.

FIG. 15 shows a perspective side view of a storage and retrieval system 1 with an inventive storage grid 400 onto which remotely operated vehicles 200 are moving horizontally on a rail system 408. The above-mentioned support displacement devices 700 are shown arranged at the end of each container support 402. This particular configuration comprises ten container supporting frameworks 401a-j arranged beneath the rail system 408, each with one container support 402 displaceable in the Y direction. Other numbers of container supporting frameworks could be present as appropriate.

The operation of retrieving and storing containers 106 from/to the illuminable storage grid 400 of the second embodiment may proceed as for the first embodiment described above.

If a target storage container 106' is not positioned next to the opening 403, i.e. there is a container space between the target storage container 106' and the opening 403, the container support 402 must be displaced a distance along the second horizontal direction Y corresponding to two grid cells 422 to position the target storage container 106' in vertically alignment with the target openings 403' of the above situated container supporting frameworks 401a-e. From the initial position of the container support 402, there may not be sufficient space in the storage grid 400 for the container support 402 to be displaced a distance corresponding to two grid cells 422 in both directions along the second direction Y. In that case the target storage container 106' can be retrieved by displacing all of the container supports above a distance of one grid cell in the opposite direction.

Hence, the following additional step is performed.

The container supports 402 of the container supporting frameworks 401a-f situated above the target storage container 106' are displaced along a positive direction Y a distance corresponding to one grid cell 422, and the container support 402 of the container support framework 401g supporting the target storage container 106' are displaced along a negative direction −Y and equal distance.

Figure 16:
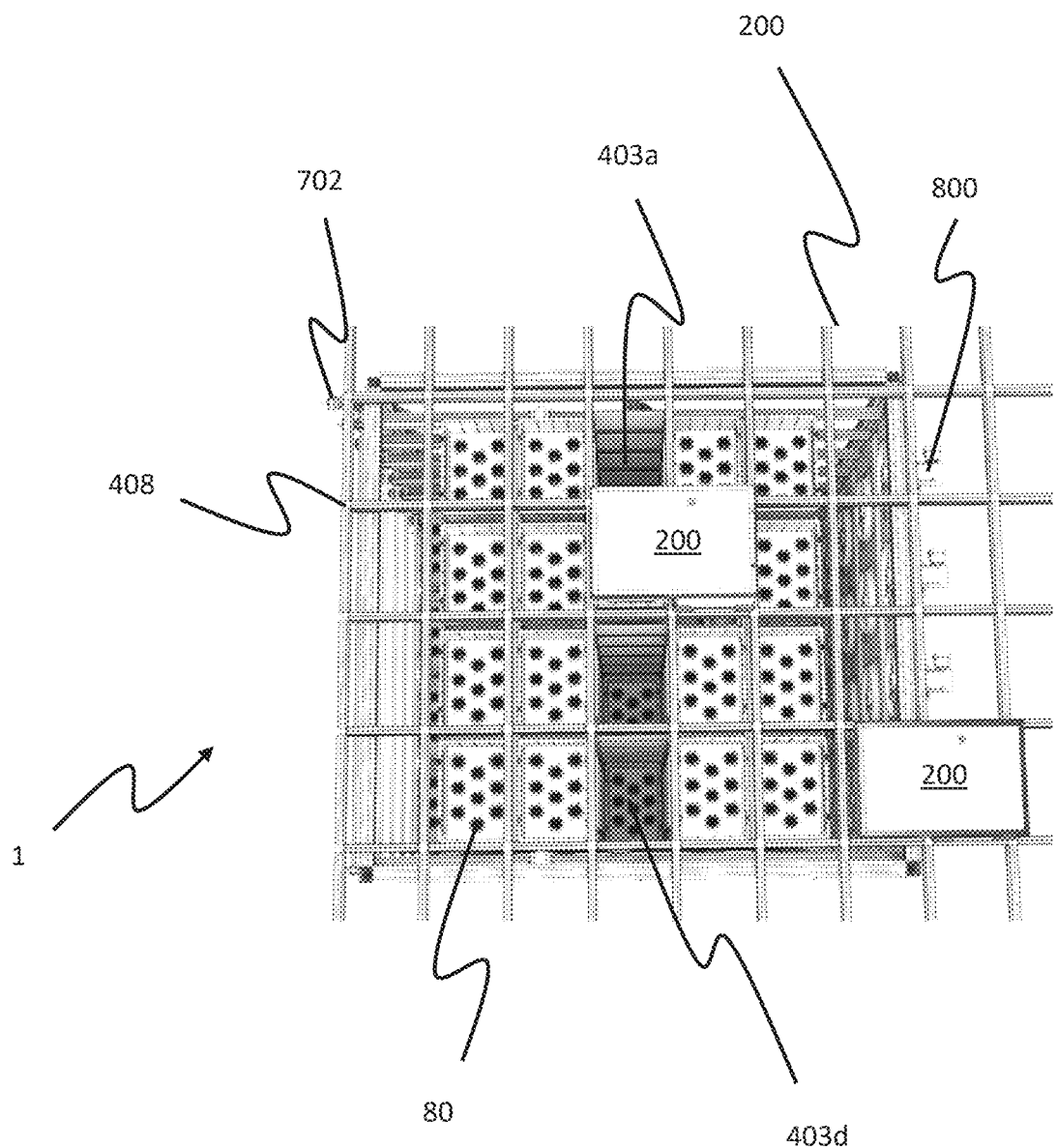
FIG. 16 is a top view of part of the storage system of FIGS. 11-15 showing plants/crops within each container.

With particular reference to FIG. 16 showing a top view of a storage and retrieval system 1, remotely operated vehicles 200,300,350 have access to the containers 106 containing crops/plants 80 situated either immediately below the rail system 408 or immediately below vertically aligned holes 403. Due to the above described configuration with horizontally displaceable container supports 402, the containers 106 accessible by the vehicles 200,300,350 via vertically aligned holes 403 may be controlled via a control system 600 and a displacement mechanism 700. Likewise, vacant illuminable units 450 may be placed within the vertically aligned holes 403.

Figure 17:
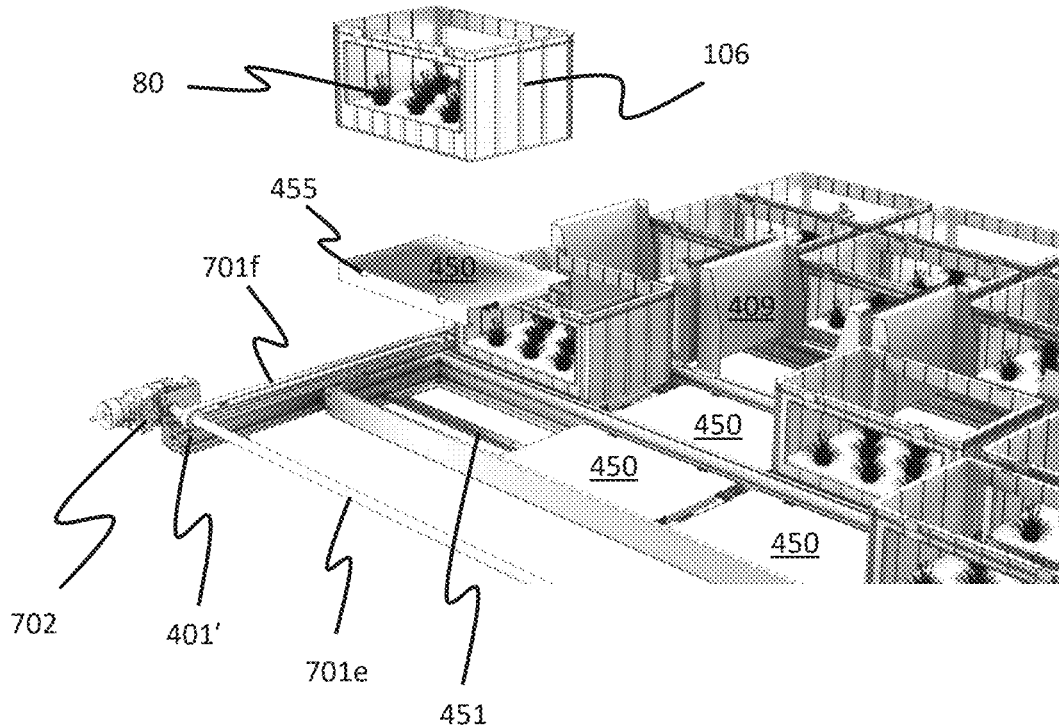
FIG. 17 is a perspective view of part of a container support comprising containers having a cultivation system stored therein and removable illumination units.
Figure 18:
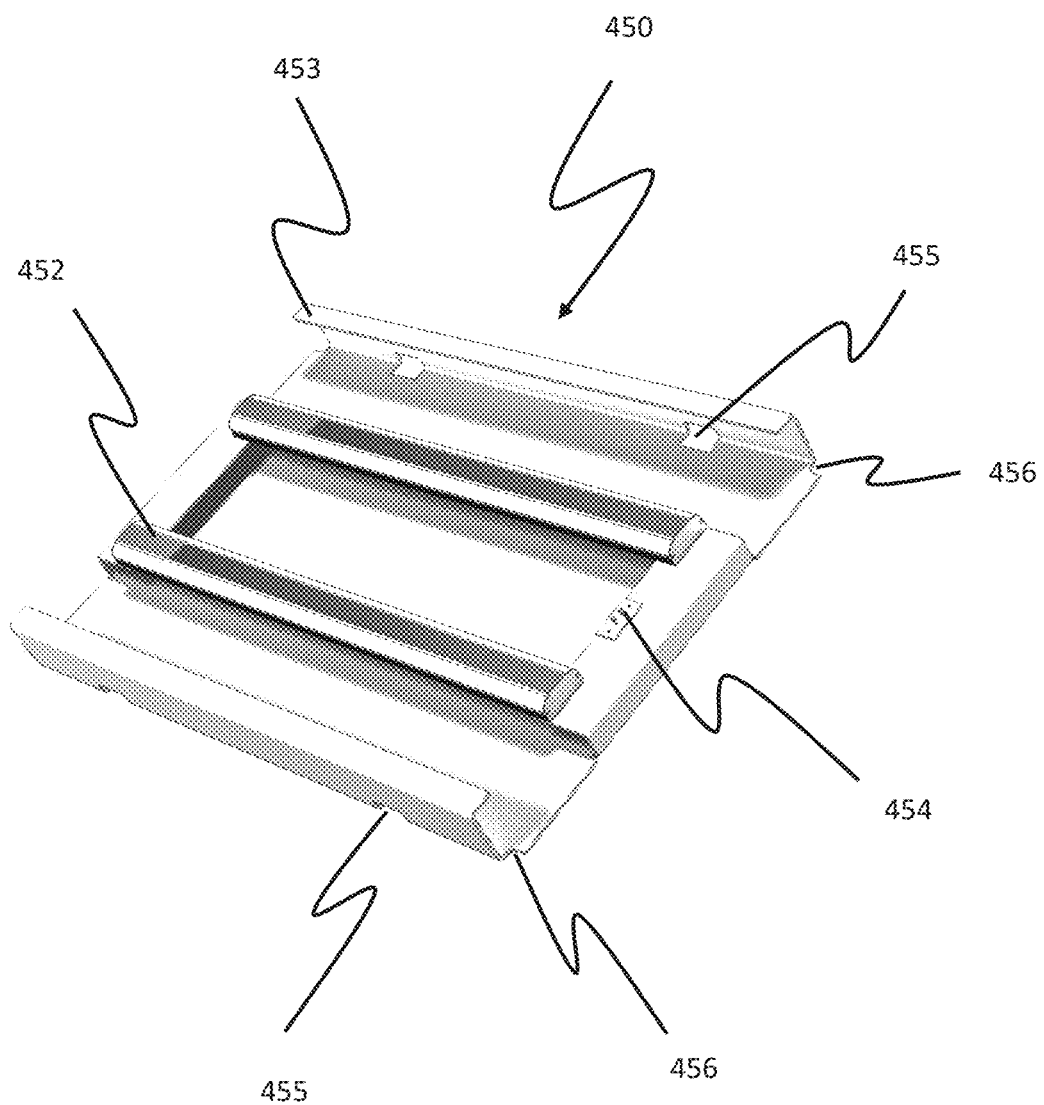
FIG. 18 is a perspective view of an illumination unit for supporting a container on one side and for illuminating an inner volume of a container on the opposite side.

FIGS. 17 and 18 show a particular exemplary configuration of a container support 402 with removable illumination units 450 supporting containers 106 with crops/plants 80 and a displacement mechanism 700 with a single displacement motor 702 driving a rotational axle 701e and a belt 701f.

Each illumination unit 450 comprises an illumination frame 453/LED frame 453, a plurality of grippable structures 455 in form of holes to enable releasable gripping by corresponding claws 362 constituting part of the lifting device 210,360, corner recesses 456 for receiving guiding pins 363 also constituting part of the lifting devices 210,360, an illumination source 452 in form of LED bars and a power connector 454 for receiving external electric power, for example from an illumination power supply 451 in form of one or more power bars extending along each row of illumination units 450 within a container support 402. The power connectors 454 may be a spring-loaded power connector to ensure sufficient contact pressure with the respective power bars 451. The power bars 451 may be a few millimeters wide metal sheets such as 3 mm Al sheets.

Furthermore, the illumination sources 452 may be incandescent light bulbs or LEDS and are preferably configured to emit intensities and/or wavelengths that optimize the cultivation of the crops/plants 80 inside each container 106.

The optimization may involve optimizing (or at least enhancing) the intensities and/or wavelengths for photosynthesis in the stored plants 80. Examples are wavelengths in the blue range and/or red range as described above.

The optimized intensities and/or intensity range and/or wavelength and/or wavelength range may be set by the user prior to illumination and/or during illumination. The latter option requires that the illuminable container support is configured to adjust the intensity/intensities and/or wavelength/wavelengths, for example via the control system 600.

As mentioned above, the choice of illumination source(s) 452, the choice of intensity and/or wavelength(s) emitted from the illumination source(s) 452, the use of illumination modifying means such as reflectors/diffusers and the distance(s) $\Delta dV, V_{r1}$ between the container supporting framework(s) 401/rail system 408 may be adjusted in order to optimize the cultivation of particular crops/plants 80.

In the preceding description, various aspects of the illuminable storage grid and the associated automated storage and retrieval system and method have been described with reference to the illustrative embodiment. For purposes of explanation, specific numbers, systems and configurations were set forth in order to provide a thorough understanding of the storage grid, the system and their workings. However, this description is not intended to be construed in a limiting sense. Various modifications and variations of the illustrative embodiment, as well as other embodiments of the grid, system or method, which are apparent to persons skilled in the art to which the disclosed subject matter pertains, are deemed to lie within the scope of the present invention.

| Reference numerals: | |
| --- | --- |
| 1 | Automated storage and retrieval system |
| 80 | Crops/plants/biological species |
| 101 | Prior art storage grid |
| 102 | Upright members of storage grid |
| 103 | Horizontal members of storage grid |
| 105 | Storage column |
| 106 | Container/storage container |
| 106' | Particular position of a container/target container |
| 106" | Vacant storage space for a container |
| 107 | Stack |
| 108 | Prior art rail system |
| 110 | Parallel rails in first direction (X) |
| 111 | Parallel rail in second direction (Y) |
| 115 | Grid opening |
| 119 | First port column/drop-off column |
| 120 | Second port column/pick-up column |
| 200 | Prior art remotely operated vehicle with cantilever |
| 201 | Vehicle body |
| 202a | Drive means/wheel arrangement, first direction (X) |
| 203b | Drive means/wheel arrangement, second direction (Y) |
| 300 | Prior art remotely operated vehicle with central cavity |
| 301 | Vehicle body |
| 302a | Drive means in first direction (X) |
| 302b | Drive means in second direction (Y) |
| 350 | Prior art storage container vehicle with offset cavity |
| 351 | Vehicle body |
| 352a | Drive means/wheel arrangement, first direction (X) |
| 352b | Drive means/wheel arrangement, second direction (Y) |
| 360 | Lifting device |
| 362 | Gripper element |
| 363 | Guiding pin |
| 400 | Illuminable storage grid |
| 401 | Horizontal container supporting framework |
| 401 | Guide track |
| 401a | Uppermost container supporting framework |
| 401b-i | Intermediate container supporting framework(s) |
| 401j | Lowermost container supporting framework |
| 401' | Container supporting framework rail |
| 402, 402a-d | Container support |
| 403, 403a-f | Hole (in container support 402) |
| 403b' | Target hole |
| 405 | Container support frame, X-direction |
| 406 | Container support frame, Y-direction |
| 407 | Support frame wheel (arranged within track 401') |
| 408 | Rail system |
| 409 | Container guiding structure (for hole/opening) |
| 410 | A first set of parallel rails |
| 411 | A second set of parallel rails |
| 415 | Grid opening |
| 422 | Grid cell |
| 430 | Vertical pillar |
| 435 | Pillar bracket |
| 450 | Illumination system/illumination unit |
| 451 | Illumination power supply for illumination system or units/power bar |
| 452 | Illumination source/LEDs/LED bars |
| 453 | Illumination frame/LED frame |
| 454 | Power connector |
| 455 | Grippable structure, recess/hole |

-continued

| Reference numerals: | |
| --- | --- |
| 456 | Guiding pin recess/corner recess |
| 600 | Control system |
| 700 | Support displacement device |
| 701 | Displacement mechanism |
| 701a | Slider |
| 701b | Threaded shaft |
| 701c | Support plate |
| 701d | Stopper |
| 701e | Rotational axle |
| 701f | Belt |
| 702 | Displacement motor |
| 703 | Bracket for displacement mechanism |
| 800 | Ventilation system |
| 900 | Floor/platform |
| X | First direction |
| Y | Second direction |
| Z | Third direction |
| $P_{rs}$ | Horizontal plane |
| $W_f$ | Width of container |
| $L_f$ | Length of container |
| $H_f$ | Height of container |
| $V_{r1}$ | Offset between lower edge of rail system and lower edge of uppermost container supporting framework/first vertical offset |
| $\Delta dV$ | Offsets between lower edges of container supporting frameworks below the uppermost container framework/vertical offset |

The invention claimed is:

1. An illuminable storage grid for storing and cultivating crops within containers, the illuminable storage grid comprising:
a plurality of horizontally extending container supporting frameworks distributed vertically with vertical offsets,
wherein each container supporting framework comprises:
a container support for supporting a plurality of containers and
a support displacement system for displacing the container support horizontally,
wherein each container support arranged above a lowermost container supporting framework display(s) at least one hole with an opening of at least a maximum horizontal cross section of the containers to be stored such that the containers can be lifted or lowered through the container support and
wherein at least one of the container supports above the lowermost container supporting framework is an illuminable container support enabling illumination.

2. The illuminable storage grid in accordance with claim 1, wherein the illuminable container support is configured to illuminate at a predetermined wavelength or wavelength range to optimize cultivation of the crops within the containers.

3. The illuminable storage grid in accordance with claim 1, wherein the illuminable container support further comprises:
a reflector configured to focus the illumination into the contents of the containers.

4. The illuminable storage grid in accordance with claim 1, wherein the illuminable container support comprises:
a container support frame and
a plurality of illumination units onto each of which at least one container may be supported,
wherein each illumination unit comprises an illumination source configured to illuminate a volume adjacent the illuminable unit.

5. The illuminable storage grid in accordance with claim 4, wherein each illumination unit is removably coupled to the container support frame.

6. The illuminable storage grid in accordance with claim 4, wherein each illumination unit further comprises an illumination frame having a lower face at which the illumination source is arranged.

7. The illuminable storage grid in accordance with claim 4, wherein at least one of the illumination units comprises a grippable structure that allows a releasably coupling to be established with a lifting device of a remotely operated vehicle operating above an uppermost container supporting framework.

8. The illuminable storage grid in accordance with claim 4, wherein the illumination unit comprises a power connector configured for receiving power from an illumination power supply and for supplying the received power to the illumination source.

9. The illuminable storage grid in accordance with claim 8, wherein the illumination power supply constitutes part of the container support frame.

10. The illuminable storage grid in accordance with claim 4, wherein the container support of each horizontal container supporting framework has principal directions in a first direction and an orthogonal second direction and is configured as a matrix of container spaces with a plurality of container spaces arranged in the first direction and a plurality of container spaces arranged in the second direction, and
wherein at least one of the plurality of illumination units is arranged in one of the plurality of container spaces.

11. The illuminable storage grid in accordance with claim 1, wherein the support displacement system comprises:
a displacement mechanism allowing displacement of the at least one container support in at least one principal direction and
a remotely controlled motor operably coupled to the displacement mechanism.

12. The illuminable storage grid in accordance with claim 1, wherein the illuminable storage grid further comprises:
a control system configured to operate the support displacement system such that the container support of at least one or more horizontal container supporting frameworks arranged above the lowermost container supporting framework may be displaced independently to each other.

13. The illuminable storage grid in accordance with claim 1, wherein the illuminable storage grid further comprises a rail system comprising:
a first set of parallel rails extending in a first direction and a second set of parallel rails extending in a second direction perpendicular to the first direction,
the first and second sets of rails forming a grid pattern comprising a plurality of adjacent grid cells, wherein each of the grid cells comprises a grid opening defined by a pair of adjacent rails of the first set of rails and a pair of adjacent rails of the second set of rails, and wherein the rail system is arranged above and adjacent to an uppermost container supporting framework at a first vertical offset being at least a maximum height of the containers to be stored.

14. The illuminable storage grid in accordance with claim 13, wherein the container supports are individually displaceable a distance corresponding to the distance of n grid cells in the first and/or second direction, where n is an integer of 1 or more.

15. The illuminable storage grid in accordance with claim 1, wherein the illuminable storage grid further comprises a ventilation system for guiding flow of air in between the plurality of container supporting frameworks.

16. The illuminable storage grid in accordance with claim 15, wherein the ventilation system comprises a plurality of ventilation fans arranged at least partly within the vertical offsets between the container supporting frameworks.

17. An automated storage and retrieval system comprising:
an illuminable storage grid for storing and cultivating crops within containers, the illuminable storage grid comprising:
a plurality of horizontally extending container supporting frameworks distributed vertically with vertical offsets,
wherein each container supporting framework comprises:
a container support for supporting a plurality of containers and
a support displacement system for displacing the container support horizontally,
wherein each container support arranged above a lowermost container supporting framework display(s) at least one hole with an opening of at least a maximum horizontal cross section of the containers to be stored such that the containers can be lifted or lowered through the container support and
wherein at least one of the container supports above the lowermost container supporting framework is an illuminable container support enabling illumination,
a plurality of containers supported on the container support of at least one of the plurality of container supporting frameworks,
a remotely operated vehicle configured to move horizontally above the plurality of container supporting frameworks, wherein the remotely operated vehicle comprises a lifting device configured to releasably grab and lift at least one of the containers and
a control system configured to monitor and control wirelessly movements of the remotely operated vehicle.

18. The automated storage and retrieval system in accordance with claim 17, wherein the support displacement system comprises:
a displacement mechanism allowing displacement of the at least one container support in at least one principal direction and
a remotely controlled motor operably coupled to the displacement mechanism,
wherein the plurality of containers are supported on the container support of each container supporting frameworks such that each container is positioned directly below the grid opening of a rail system and wherein the remotely operated vehicle is configured to move horizontally in a first direction and a second direction on the rail system and to lift the container through the grid opening by use of the lifting device.

19. A method for storing and retrieving containers with crops for cultivation from an automated storage and retrieval system in accordance with claim 17,
wherein the at least one illuminable container support comprises a container support frame and a plurality of illumination units onto each of which at least one container may be supported,
wherein each of the plurality of illumination units is coupled to the container support frame, and comprises an illumination source configured to illuminate a volume adjacent the illumination unit, wherein the method comprises following steps:

A. moving the remotely operated vehicle to a position where its lifting device is positioned in vertical alignment above either a target container supported on an uppermost container supporting framework or, if the target container is situated on one of the container supporting frameworks beneath the uppermost container supporting framework, a target hole of the uppermost container supporting framework located horizontally closest to the target container,
B. if the target container is not positioned in vertical alignment below the target hole of the uppermost container supporting framework, displacing the container support of at least one of the plurality of container supporting frameworks until the target container is in vertical alignment below the target hole of the uppermost container supporting framework and holes of any container supporting frameworks arranged between the container supporting framework with the target container and the uppermost container supporting framework,
C. lowering, grabbing and lifting the target container by use of the lifting device and
D. moving the remotely operated vehicle with the target container to another horizontal location.

20. The method in accordance with claim 19, wherein step B involves equally displacing one or more container supporting frameworks arranged above the container supporting framework containing the target container.

* * * * *